US008936194B1

(12) United States Patent
Welch et al.

(10) Patent No.: US 8,936,194 B1
(45) Date of Patent: Jan. 20, 2015

(54) METHODS AND SYSTEMS FOR USING TWO-DIMENSIONAL MATRIX CODES ASSOCIATED WITH PANEL COMPONENT AND EQUIPMENT INFORMATION AND QUALITY CONTROL

(71) Applicants: Donald Welch, Winslow, ME (US); Alan Libby, Waterville, ME (US); Eugene L. Lambert, Exeter, NH (US); Joel Gil, Kingwood, TX (US); Dennis Euers, Fayetteville, GA (US)

(72) Inventors: Donald Welch, Winslow, ME (US); Alan Libby, Waterville, ME (US); Eugene L. Lambert, Exeter, NH (US); Joel Gil, Kingwood, TX (US); Dennis Euers, Fayetteville, GA (US)

(73) Assignee: Wunderlich-Malec Engineering, Inc., Minnetonka, MN (US)

( * ) Notice: Subject to any disclaimer, the term of this patent is extended or adjusted under 35 U.S.C. 154(b) by 0 days.

(21) Appl. No.: 13/843,149

(22) Filed: Mar. 15, 2013

(51) Int. Cl.
G06K 19/00 (2006.01)
G06K 7/14 (2006.01)

(52) U.S. Cl.
CPC .................................. G06K 7/1417 (2013.01)
USPC ...... 235/462.11; 235/435; 235/439; 235/451; 235/462.01

(58) Field of Classification Search
USPC ........................................................ 235/462
See application file for complete search history.

(56) References Cited

U.S. PATENT DOCUMENTS

| 4,094,244 | A  | 6/1978 | Edwards et al. |
|-----------|----|--------|----------------|
| 7,028,911 | B2 | 4/2006 | Cheung et al.  |
| 7,190,257 | B2 | 3/2007 | Maltseff et al.|
| 7,328,848 | B2 | 2/2008 | Xia et al.     |
| 7,702,162 | B2 | 4/2010 | Cheong et al.  |
| 7,751,629 | B2 | 7/2010 | Cheong et al.  |

(Continued)

FOREIGN PATENT DOCUMENTS

AU 2009202557 A1 1/2011
WO 2012149778 A1 11/2012

OTHER PUBLICATIONS

Rouillard, Jose, Contextual QR Codes, Proceedings of the Third International Multi-Conference on Computing in the Global Information Technology, ICCGI, 2008, 6 pages.

(Continued)

*Primary Examiner* — Matthew Mikels
(74) *Attorney, Agent, or Firm* — McDonnell Boehnen Hulbert & Berghoff LLP

(57) ABSTRACT

Systems and methods for creating and using 2-dimensional matrix code on tags or labels to identify panel components and associated information stored in and accessible from a data storage device or server or computer with a document management system (DMS). Related information can be encoded into an identifier using a URL with hyperlink onto a 2D matrix tag or label attached to specific panel component or wire. The information encoded in the 2D matrix code can be decoded using an interactive reader and data capture device such as a smart-phone or tablet computing device. Use the capture device's decoded information to provide interactive access and visual display to the interactive URL and hyperlink related information in the DMS. The capture device can be configured to provide immediate intelligence and functions with comparison and confirmation of quality, functionality, maintenance, status, and conformity with respect to panel components.

21 Claims, 26 Drawing Sheets

(56) References Cited

U.S. PATENT DOCUMENTS

| | | | |
|---|---|---|---|
| 7,886,978 | B2 | 2/2011 | Ofek |
| 7,974,435 | B2 | 7/2011 | Maltagliati et al. |
| 8,196,842 | B2 | 6/2012 | Wang |
| 8,228,993 | B2 | 7/2012 | Priti et al. |
| 8,295,622 | B2 | 10/2012 | Canel-Katz et al. |
| 8,353,447 | B2 | 1/2013 | Yach |
| 2002/0036235 | A1* | 3/2002 | Kudo .................. 235/462.01 |
| 2004/0020989 | A1* | 2/2004 | Muramatsu ............. 235/462.1 |
| 2006/0114487 | A1 | 6/2006 | Caveney, Jr. et al. |
| 2009/0028453 | A1 | 1/2009 | Collomosse et al. |
| 2011/0081860 | A1 | 4/2011 | Brown et al. |
| 2011/0210171 | A1 | 9/2011 | Brown et al. |
| 2012/0024956 | A1 | 2/2012 | Chen |
| 2012/0060964 | A1 | 3/2012 | Sato et al. |
| 2012/0128267 | A1 | 5/2012 | Dugan et al. |
| 2012/0138671 | A1 | 6/2012 | Gaede et al. |
| 2012/0284593 | A1 | 11/2012 | Rodriguez |
| 2012/0313963 | A1 | 12/2012 | Chen-Quee et al. |
| 2013/0001291 | A1 | 1/2013 | Ibrahimbegovic et al. |
| 2013/0037608 | A1 | 2/2013 | Evevsky |

OTHER PUBLICATIONS

Huang, Yo-Ping, QR Code Data Type Encoding for Ubiquitous Information Transfer Across Different Platforms, IEEE Computer Society, Symposia and Workshops on Ubiquitous, Autonomic and Trusted Computing, 2009, pp. 292-297.

Brady Worldwide Inc.; BBP11 Label Printer, downloaded on Jul. 22, 2013 from the World Wide Web at http://www.bradyid.com.sg/en-sg/brady_resources/product_catalogues/catalogue_index/~/media/brady/apac/singapore/Catalogues/printers/Brady%20BBP11%20Label%20Printer%20Sell%20Sheet.pdf, 2 pages.

Brady Corporation Asia Pte Ltd, Industrial, Electronic Electrical Identification Products, Aug. 2009, 14 pages.

Scanbuy Inc, QR Code Generator and Manager | Barcode +QR Reader Apps | Scan Life; downloaded from the World Wide Web at http://web.archive.org/web/20130115215412/http://www.scanlife.com/en/, Mar. 13, 2013, 2 pages.

Matrix Code, downloaded from the World Wide Web at http://web.archive.org/web/20120622160842/http://en.wikipedia.org/wiki/Matrix_code, Jun. 22, 2012, 1 page.

Denso ADC, QR Code Essential, 2011, 12 pages.

QR Code, downloaded from the World Wide Web at http://web.archive.org/web/20130314174052/http://en.wikipedia.org/wiki/QR_Code, Mar. 14, 2013, 9 pages.

* cited by examiner

Figure 12

RECORDS & DATA SERVER

METHODS AND SYSTEMS FOR USING TWO-DIMENSIONAL MATRIX CODES ASSOCIATED WITH PANEL COMPONENT AND EQUIPMENT INFORMATION AND QUALITY CONTROL

BACKGROUND

Unless otherwise indicated herein, the elements described in this section are not prior art to the claims and are not admitted to be prior art by inclusion in this section.

Electronic control panels and packaged enclosures use basic wire numbers that are associated with identical tag numbers depicted in drawings or document schedules. Retrieval of and reference to wire numbers occurs by manually accessing hard copies or searching for the wire numbers in an electronic file. The wire number information on a set of paper drawings can be changed or become obsolete. Changes and obsolesce can degrade the quality of the control panel.

Past attempts to provide greater information on instruments, panels, fabrication plants, and construction sites use linear bar code tagging on wires and cables. The problem with the linear bar coding is that the information is limited and can result in bar codes being physically too long. These lengthy bar codes would get bent over time and would cause a bar code reader to default and not provide accurate information.

SUMMARY

This application describes several example embodiments, at least some of which pertain to associating two-dimensional matrix codes with panel components configured for use within a panel, such as an electronic control panel. At least some of the example embodiments pertain to capturing a two-dimensional matrix code associated with a panel component and retrieving, from a data storage device, data associated with the panel component and the two-dimensional matrix code.

In one respect, an example embodiment can take the form of a method comprising (i) capturing, by a capture device, a first two-dimensional matrix code associated with a first panel component, (ii) decoding, by the capture device, the first two-dimensional matrix code to recover first data encoded within the first two-dimensional matrix code, (iii) transmitting, from the capture device, at least a portion of the recovered first data, and (iv) receiving, by the capture device, second data associated with the first panel component.

In another respect, an example embodiment can take the form of a method comprising (i) receiving, by a server device from a capture device that captured a first two-dimensional matrix code associated with a first panel component, at least a portion of data encoded within the first two-dimensional matrix code, (ii) retrieving, by the server device, data that is associated with the first panel component, and (iii) transmitting, from the server device to the capture device, the data associated with the first panel component.

In yet another respect, an example embodiment can take the form of a method (i) capturing, by a capture device, a two-dimensional matrix code positioned on a tag or wire label attached to a signal conductor or panel component, (ii) decoding, by the capture device, the two-dimensional matrix code to recover data encoded within the two-dimensional matrix code, (iii) transmitting, from the capture device, at least a portion of the recovered data, and (iv) receiving, by the capture device, data that is associated with the signal conductor or communication instrument to which the tag is attached.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

These and other features will become apparent from the following description with reference to the accompanying drawings in which:

FIG. 12 shows an example display screen including example data from a data record retrieved from a data storage device;

DETAILED DESCRIPTION

I. Introduction

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of $1^{st}$, $2^{nd}$, $3^{rd}$, and so on.

The systems and flow diagrams shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions) can be used instead. Furthermore, various functions described as being performed by one or more elements can be carried out by a processor executing computer-readable program instructions or by any combination of hardware, firmware, or software. Drawing elements having identical numbers in the various drawings can be similar or substantially similar elements.

II. Example System Architecture

Figure 1:
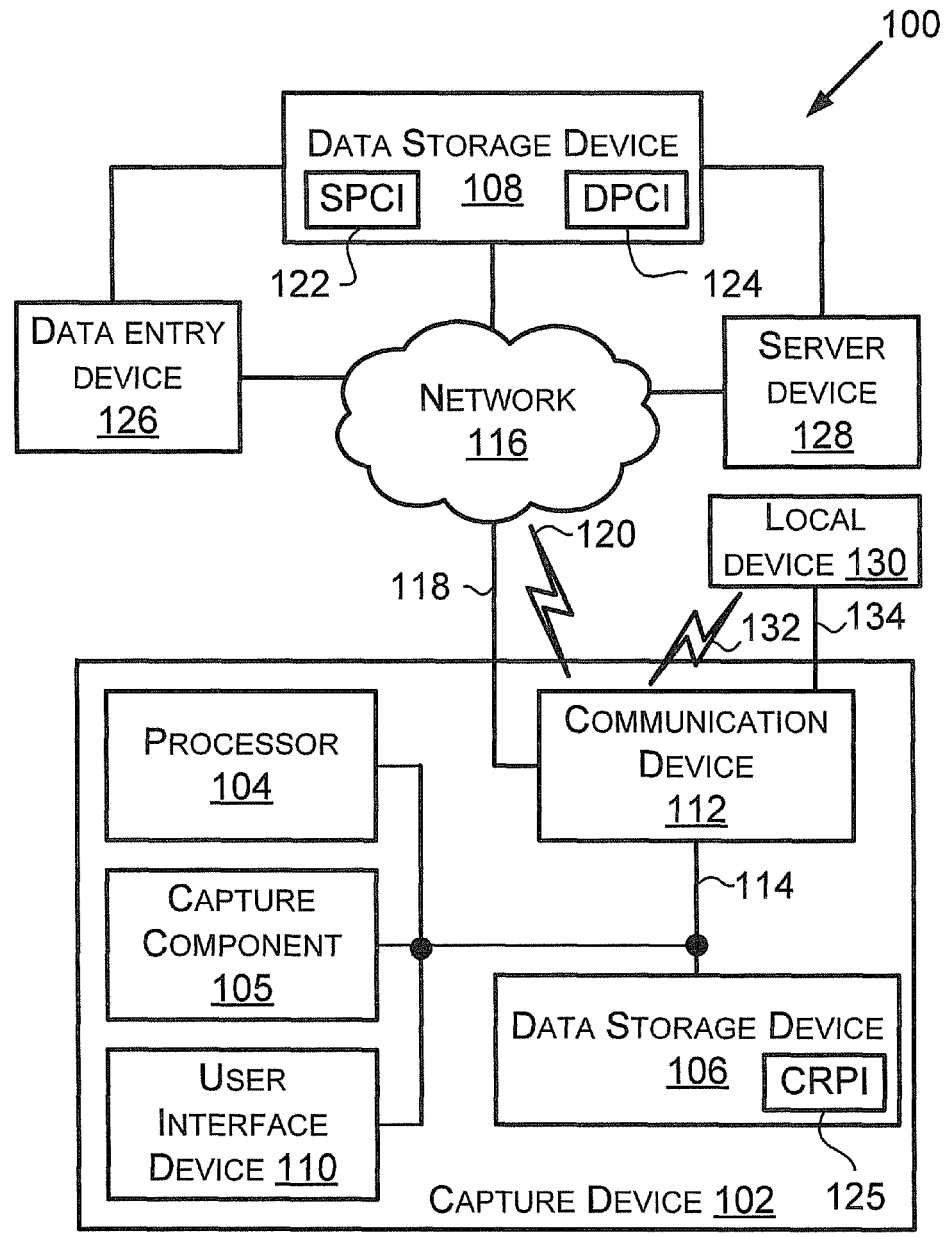
FIG. 1 is a block diagram of a system in accordance with one or more example embodiments.

FIG. 1 is a block diagram of a system 100 in accordance with one or more example embodiments. System 100 includes a capture device 102, a data storage device 108, a network 116, a data entry device 126, a server device 128, and a local device 130. Network 116 can include at least a portion of the Internet. Capture device 102 can comprise a processor 104, a capture component 105, a data storage device 106, a user interface device 110, and a communication device 112, all of which can be linked together via a system bus, network, or other connection mechanism 114.

Capture device 102 can comprise or be arranged as a tablet device, such as an IPAD tablet or IPHONE produced by Apple, Inc. of Cupertino, Calif., a smart-phone, such as a Galaxy S III smart-phone produced by Samsung Electronics of Suwon, South Korea, or a personal digital assistant (PDA). Other capture devices operational in system 100 can be arranged like capture device 102 to request and receive data stored at data storage device 108.

Capture component 105 can be arranged to capture images, such as images of two-dimensional matrix codes, or more simply "2D matrix codes." Capture component 105 can comprise an image sensor and electrical circuitry to convert a captured image into data storable in data storage device 106. Capturing 2D matrix codes is referenced in FIG. 23, block 2310.

A processor, such as processor 104, can comprise one or more general purpose processors (for example, INTEL single core microprocessors or INTEL multicore microprocessors) or one or more special purpose processors (for example, application specific integrated circuits (ASICs) or digital signal processors (DSPs)). A processor, such as processor 104, can execute computer-readable program instructions, such as computer-readable program instructions (CRPI).

A data storage device, such as data storage device 106 or data storage device 108, can comprise a non-transitory computer-readable storage medium that is readable by a processor. The computer-readable storage medium can comprise volatile and/or non-volatile storage components, such as optical, magnetic, organic or other memory or disc storage, which can be integrated in whole or in part with a processor. A data storage device may also or alternatively be provided separately, as a non-transitory machine readable medium. Data storage device 106 includes CRPI 125 executable by processor 104. Data storage device 108 can also include CRPI.

CRPI 125 can comprise program instructions to decode a 2D matrix code to recover data encoded within the 2D matrix code. CRPI 125 can comprise program instructions to generate a message including at least a portion of the recovered data. Communication device 112 can transmit the message including the at least a portion of the recovered data to network 116 for transmission, in turn, to data storage device 108 to request data associated with a panel component.

User interface device 110 can comprise any of a variety of components to present information or to receive user-input. As an example, user interface device 110 can comprise a display device, such as a light emitting diode (LED) display device operable to visually present information, such as information associated with a panel component or operator instructions (see, FIG. 17, block 1718). As another example, user interface device 110 can comprise an audio speaker operable to audibly present information, such as information associated with a panel component. As yet another example, user interface device 110 can comprise a haptic device to provide tactile feedback, such as tactile feedback indicating connection of two panel components is a correct connection or an incorrect connection.

User interface device 110 can comprise one or more selectors, such as a touch screen of the display device, a keypad, button, switch or some other selector. A selector can be used to enter the user-input received by user interface device 110. As an example, the user-input can be a selection to capture a 2D matrix code or to send data recovered from a 2D matrix code to network 116 for retrieving panel component information from data storage device 108.

Communication device 112 can comprise an interface to network 116. The network interface can comprise a transmitter configured to transmit data to network 116 using wired communication link 118 or wireless communication link 120. The network interface can comprise a receiver configured to receive data transmitted from network 116 using wired communication link 118 or wireless communication link 120.

Figure 17:
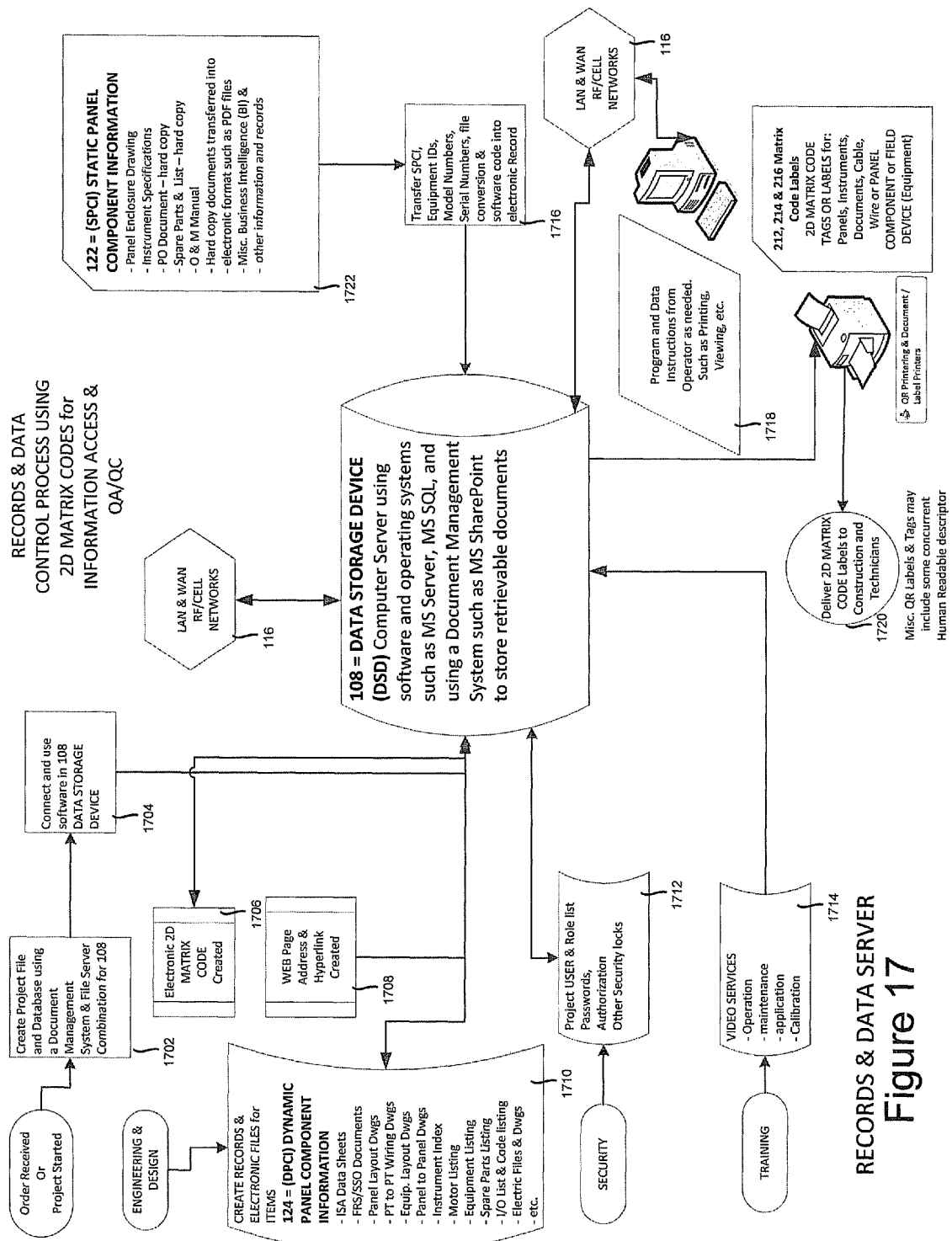
FIG. 17 shows example content, inputs and outputs of a data storage device.
Figure 23:
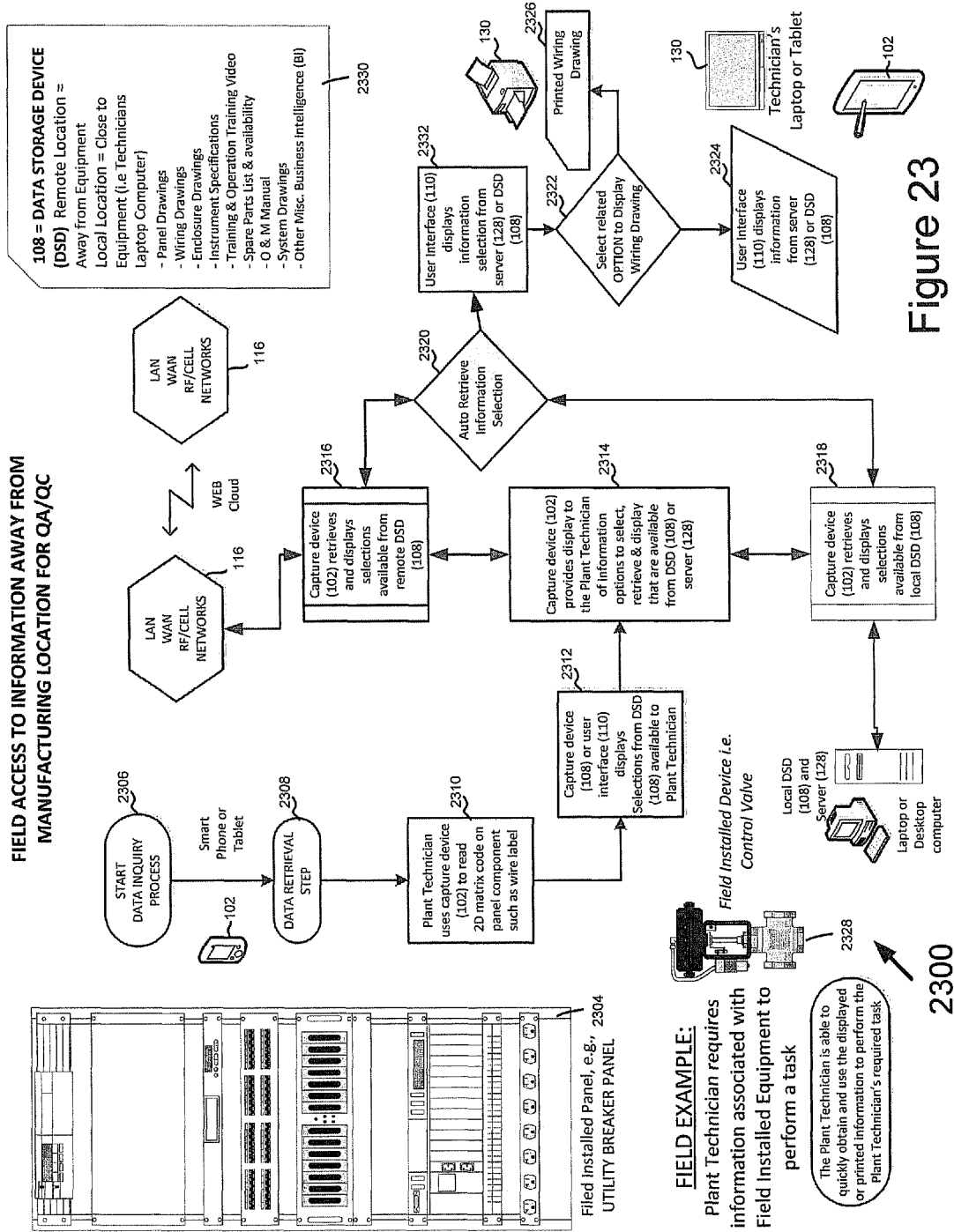
FIG. 23 is a flow chart showing an example functions a plant technician can perform using a two-dimensional matrix label to obtain wiring information for a panel or panel component.

Data storage device 108 can include static panel component information (SPCI) 122 and dynamically-changeable panel component information (DPCI) 124. SPCI 122 can comprise multiple SPCI components, each component associated with a panel component and a 2D matrix code. FIG. 17, block 1722, identifies examples of SPCI 122. DPCI 124 can comprise multiple DPCI components, each component associated with a panel component and a 2D matrix code. FIG. 17, block 1710, identifies examples of DPCI 124. A computing device, such as a server, can execute CRPI to receive the 2D matrix code associated with a panel component, retrieve the SPCI or DPCI component(s) associated with that panel component, and transmit the retrieved SPCI or DPCI component(s) to network 116 for transmission, in turn, to a capture device that captured the 2D matrix code received by the server. Training information can also be stored within data storage device 108. See, FIG. 17, block 1714. Additional examples of data storable in data storage device are shown at FIG. 23, block 2330.

Data entry device 126 can comprise a device for entering panel control information for providing to server device 128 or storing within data storage device 108. As an example, data entry device 126 can comprise a computing device, such as a desktop or laptop computer. Data entry device 126 can be used for selecting panel component information to be associated with a particular 2D matrix code and particular panel component. Selecting the panel control information can include selecting electronic copies of information generated for constructing a panel or information from a manufacturer of panel components. Drawings generated for panel construction or other reasons can include one or more 2D matrix codes to associate items on the drawings with panel components referenced on the drawings. Data entry device 126 or server 128 can be used to perform the project file creation function shown in FIG. 17 at block 1702. SPCI 122 or DPCI 124 entered using data entry device can be transferred to data storage device 108 (see, FIG. 17, block 1716).

Server device 128 can comprise a device having a processor that executes CRPI for carrying out various functions described herein as being carried out by a server. Those functions include, for example, storing panel component information into data storage device 108, receiving requests for panel control information from a capture device, retrieving requested panel control information from data storage device 108, transmitting retrieved panel control information to a capture device that requested the panel control information, and generating 2D matrix codes. Server device 128 can comprise a desktop or laptop computer. Server device can comprise data storage device 108 or a data storage device comprising any of the data or information described as being within data storage device 108.

Local device 130 can comprise a device configured to communicate with communication device 112 of capture device 102 using a wireless communication link 132 (such as an IEEE 802.11 link or a WiFi link) or a wired communication link (such as a universal serial bus (USB) link). As an example, local device 130 can comprise a printer configured to print panel component information provided to capture device 102. As another example, local device 130 can comprise an LED display (such as an LED display configured for connection to a desktop computer) for displaying panel component information provided to capture device 102.

Figure 2:
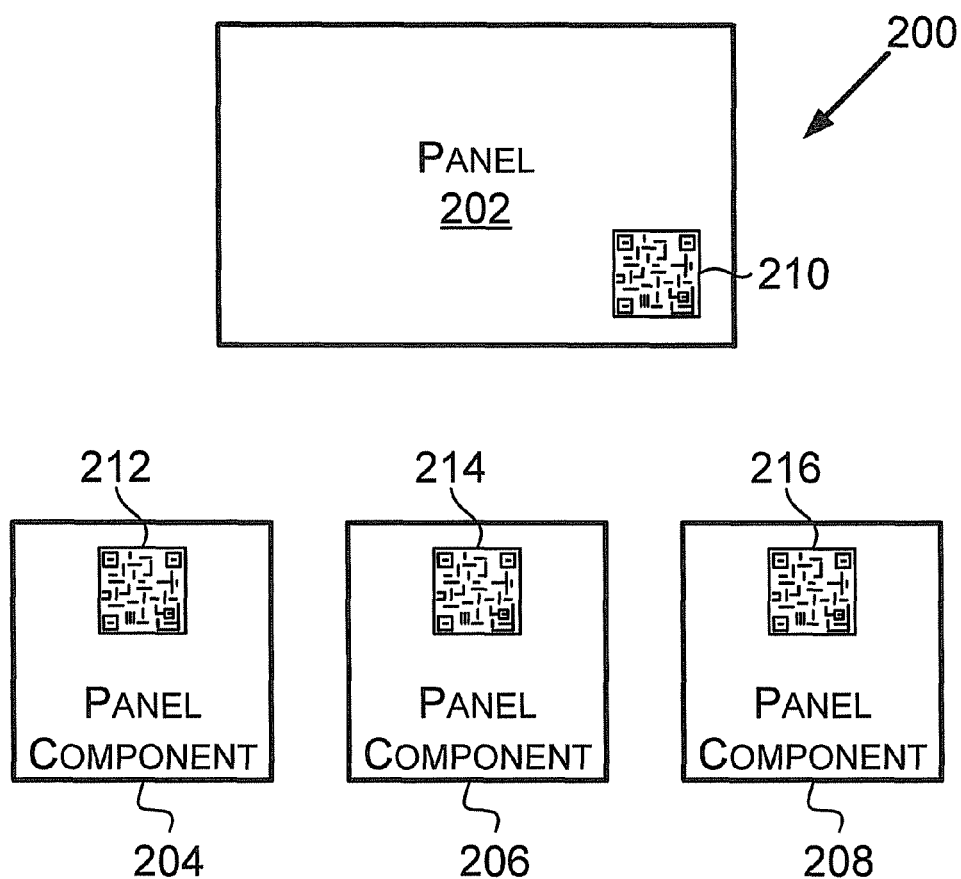
FIG. 2 is a block diagram showing another example system in accordance with one or more example embodiments.

Next, FIG. 2 is a block diagram showing an example system 200 in accordance with one or more example embodiments. System 200 comprises a panel 202 and panel components 204, 206, and 208.

Panel 202 can be arranged as any of a variety of panels. For example, panel 202 can be arranged as a program logic controller (PLC) panel, a solenoid panel, a marshaling panel, a machine control console panel, a plant distributed control system (DSC) control panel, a modular control house, a power distribution protective relay and control panel, a relay protection panel, a transformer protection panel, a substation control panel, a backup power panel, a service station switchgear panel, a control console, a remote terminal unit panel, a revenue metering panel, a transfer trip panel, a life safety monitoring system panel, or a communication and fiber optic panel. Other example arrangements of panel 202 are also possible. FIG. 23 shows an example utility breaker panel 2304.

Panel 202 can be referred to as a control panel, a power distribution panel, or by some other term describing some functionality performed by panel component(s) of panel 202. Panel 202 can be located within one or more other panels. Additionally or alternatively, panel 202 can comprise one or more other panels. Panel 202 can comprise an enclosure for housing panel components, such as panel components 204, 206, 208. Panel 202 can comprise one or more panel components outside of the panel.

Panel component 204 can comprise a component specified for use as part of a control panel. As an example, panel component 204 can comprise a signal conductor, an insulated wire, a coaxial cable, a fiber optic cable, a communication instrument, a relay, a field device, a variable frequency drive, a PLC, a fuse, a circuit breaker, a conductor terminal, a transformer, a switchgear component, a power supply (such as a 120 VAC to 24 VDC power supply), a PLC fused sinking 32 point output module, a PLC sourcing input module, a PLC chassis, a breaker failure relay, a breaker protection relay, an IED, an Ethernet cable, an Ethernet switch with fiber optic connections, an RS232 media convertor, an RS485 protocol convertor, a control breaker rotary switch, a lockout relay, a PLC redundancy communication module, a 75 ohm terminator plug, a PLC fiber optic repeater, a current ammeter, a current differential relay, a cutoff switch, a DynaStar frame relay, firewall, an LED message display, a PLC Modbus master/slave communication module, a power meter, a re-closer relay, a re-closing cutoff switch, a satellite clock, a test switch type FT-19R, a power line carrier, an RTU, an RTU WESDAC D.20 communication interface, a D20 RTU, a D400 RTU, a distance protection relay, an RTU fiber driver, a battery, a battery charger, Panduit, a hi-current fuse, an AC circuit breaker, a pilot light, a pushbutton, a pressure switch, an I/P transducer, a control valve, a pneumatic regulator, a pressure regulator, a bulkhead fitting, a temperature transmitter, a signal isolator, a signal repeater, or some other panel component.

Panel component 206, panel component 208, or some other panel component(s) can be arranged like panel component 204. In that regard, the foregoing description of panel component 204 can be applicable to panel component 206, panel component 208, or some other panel component(s).

Panel 202 comprises a 2D matrix code 210. Panel components 204, 206, and 208, comprise 2D matrix codes 212, 214, and 216, respectively. A 2D matrix code can comprise a multi-dimension code, such as a 2D (2D) code. As an example, a 2D matrix code can comprise a Quick Response (QR) code, an Aztec code, a high capacity color barcode (HCCB) code, or some other 2D matrix code.

A 2D matrix code, such as 2D matrix codes 210, 212, 214, or 216, can be attached to a panel component using any of a variety of methods. For example, the 2D matrix code can be attached to the panel component by attaching a tag with a 2D matrix code to the panel component. The 2D matrix code can be printed on the tag. The 2D matrix code can be etched into the tag. The 2D matrix code can be affixed to the tag using an adhesive. In that regard, the tag can be printed on a material (e.g., paper or foil) having an adhesive backing. The tag can be removably attachable to the panel component. As another example, the 2D matrix code can be printed on, etched into, or affixed to the panel component without a tag.

A 2D matrix code can comprise a static 2D matrix code. Each static 2D matrix code can be associated with the static panel component information (SPCI) 122 or dynamically-changeable panel component information (DPCI) 124. A 2D matrix code can be encoded with information, recoverable by data capture device 102, to request SPCI 122 or DPCI 124 associated with a panel component tagged with the 2D matrix code.

Figure 3:
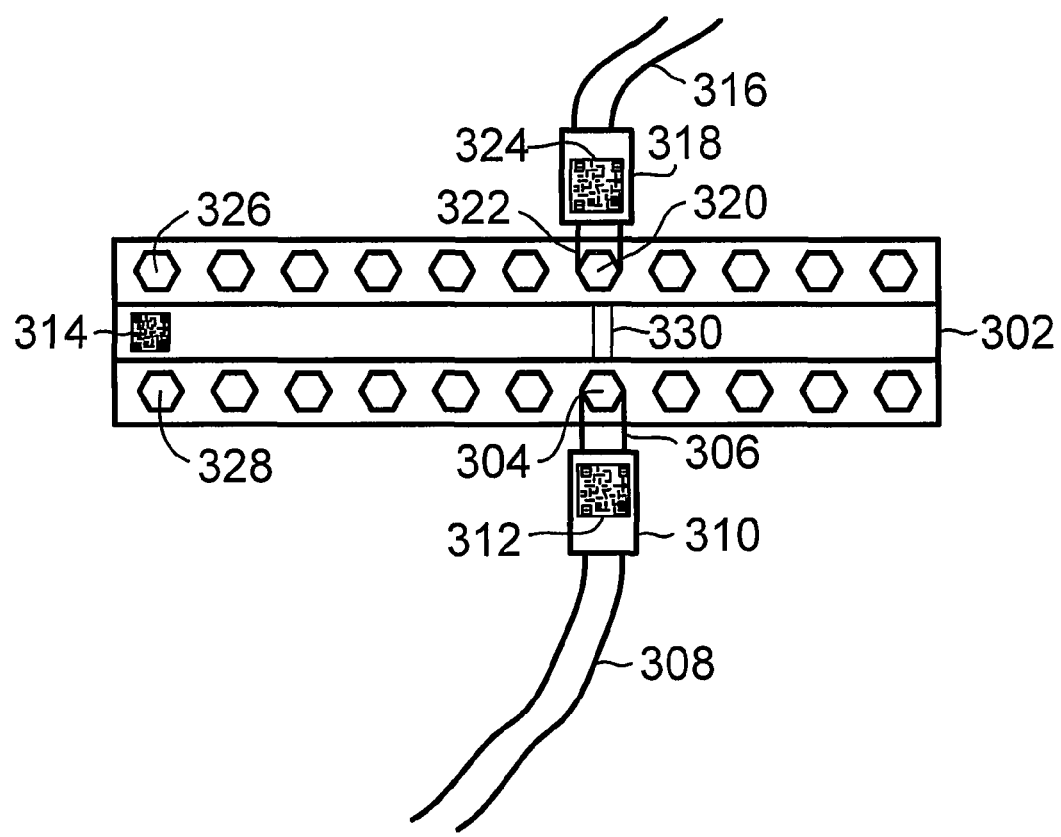
FIG. 3 depicts example panel components having two-dimensional matrix codes.

Next, FIG. 3 depicts example panel components having 2D matrix codes. The panel components shown in FIG. 3 include a terminal block 302 and conductors 308 and 316. Conductors 308 and 316 can comprise insulated copper wires or some other type of conductor. The terminal block 302 includes terminal connectors 304, 320, 326, 328 and eighteen other terminal connectors. A terminal 306 attached to conductor 308 is removably attached at terminal connector 304. Similarly, a terminal 322 attached to conductor 316 is removably attached at terminal conductor 320. Terminal block 302 includes a terminal 330 to connect similar conductors as those connected to connector terminals 304 and 320.

A conductor tag 310 having 2D matrix code 312 is associated with conductor 308. Similarly, a conductor tag 318 having 2D matrix code 324 is associated with conductor 316. Conductor tags 310 and 318 can comprise a wire label, a heat shrink tube or some other tube that surrounds a portion of conductors 308 and 316, respectively. 2D matrix codes 312 and 324 can be printed onto conductor tags 310 and 318, respectively. As shown in FIG. 3, the 2D matrix codes 312 and 324 are located substantially close to a point of signal termination.

Figure 26:
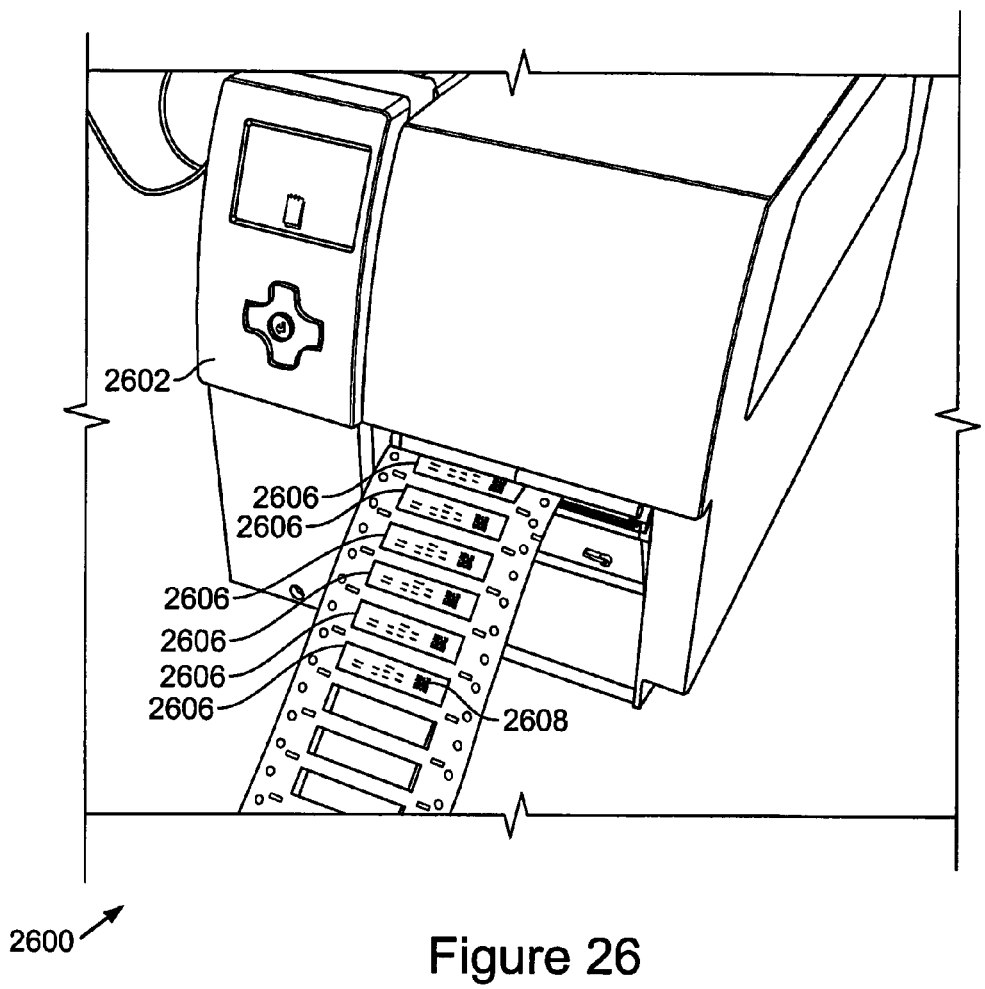
FIG. 26 is an image showing a printer provided with a ribbon of perforated wire labels.

FIG. 26 is an image 2600 showing a printer 2602 provided with a ribbon of perforated wire labels 2606. Printer 2602 can be provided with a label file including data for printing 2D matrix codes, such as 2D matrix code 2608, onto a wire label 2606. As an example, printer 2602 can comprise a BP-PR300 Plus printer provided by Brady Corporation, Milwaukee, Wis. Printer 2602 can be connected to a computing device, such as data entry device 126 or server 128, directly or using network 116 to receive the label files including data for printing 2D matrix codes. Printing the 2D matrix codes onto the wire labels based on the label files provide for permanent, reliable and consistent reading of the 2D matrix codes using a capture device.

Terminal block 302 includes 2D matrix code 314. The SPCI 122 can include information associated with 2D matrix code 314 such as an identifier of a manufacturer that produced terminal block 302 or a position of terminal connectors 326 and 328. The DPCI 124 can include information associated with 2D matrix code 314 such information that identifies a conductor to be connected to terminal connector 326 and a conductor to be connected to connector 328.

III. Example Operation

Figure 4:
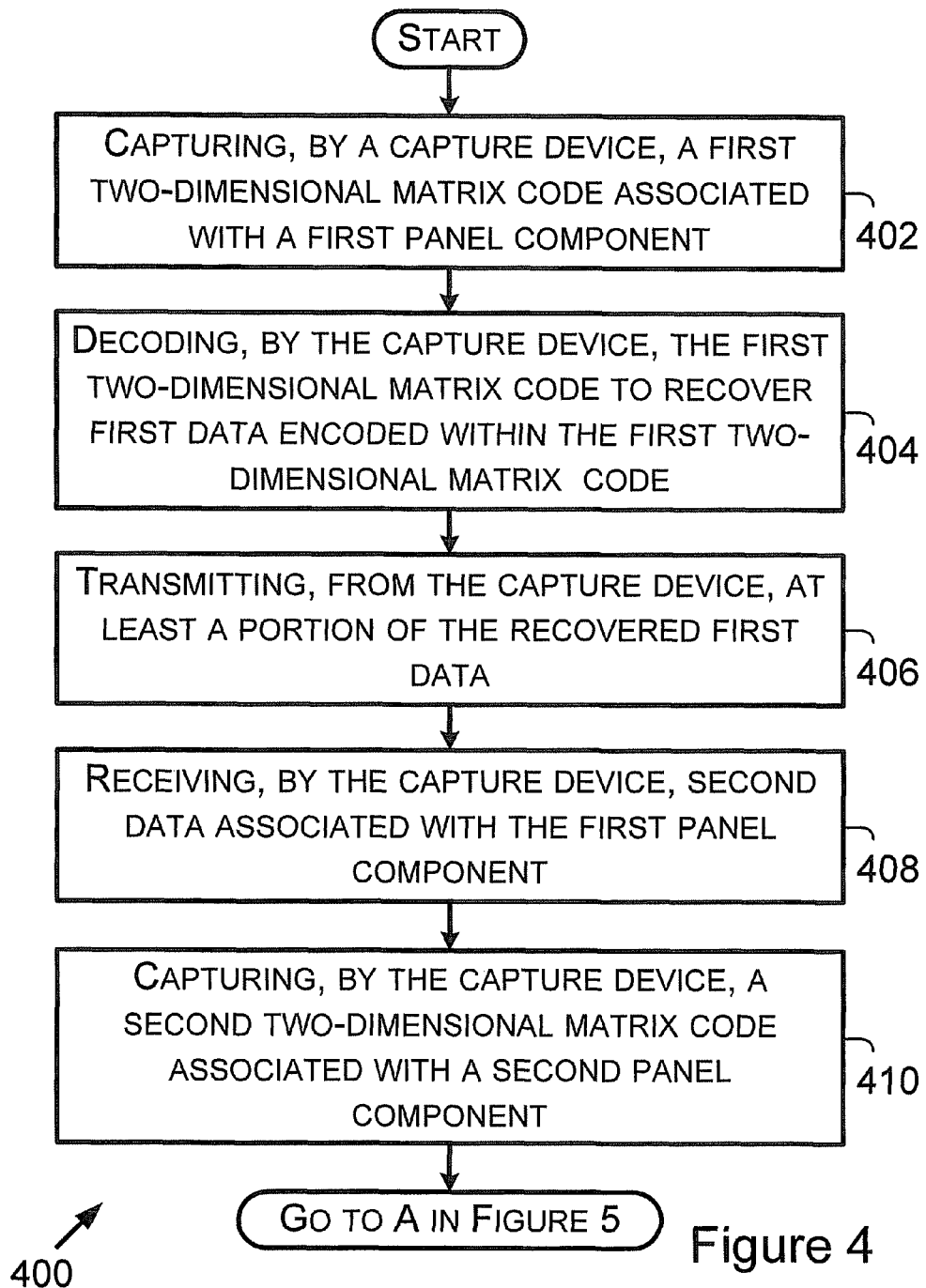
FIGS. 4 and 5 depict a flowchart showing a set of functions that can be carried out in accordance with one or more example embodiments.
Figure 5:
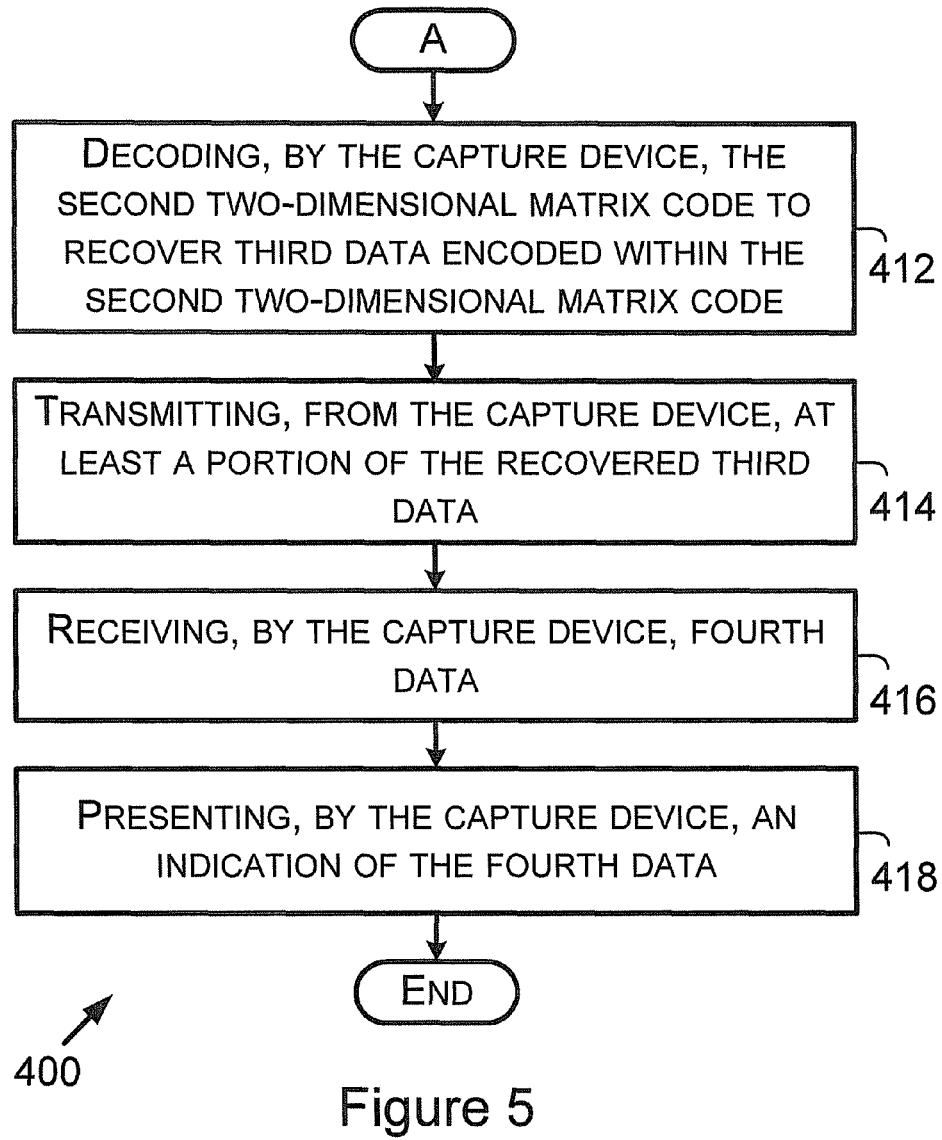

FIGS. 4 and 5 depict a flowchart showing a set of functions 400 (or more simply, "the set 400") that can be carried out in accordance with one or more example embodiments described herein. The functions of the set 400 are shown within blocks labeled with even numbers between 402 and 418, inclusive. Each function of the set 400 can be performed by an element or a combination of elements of system 100. A person having ordinary skill in the art will understand that the capture device referred to in set 400 can be any capture device described herein. For purposes of describing the set 400, however, that capture device is referred to capture device 102.

Block 402 includes capturing, by a capture device 102, a first 2D matrix code associated with a first panel component. The first 2D matrix code can comprise a quick response (QR) code or another type of multi-dimension 2D matrix code. The first panel component can, for example, comprise any of the panel components identified in this description. Capturing the first 2D matrix code can include capture component 105 capturing an image of the first 2D matrix code. Capture component 105 can provide the image of the first 2D matrix code for storage within data storage device 106.

Next, block 404 includes decoding, by the capture device 102, the first 2D matrix code to recover first data encoded within the first 2D matrix code. Decoding the first 2D matrix code can comprise processor 104 executing program instructions of CRPI 125 to decode the first 2D matrix code. In one respect, decoding the first 2D matrix code can occur automatically in response to capturing of the first 2D matrix code. In another respect, decoding the first 2D matrix code can occur in response to user interface device 110 being used to enter a selection to decode the first 2D matrix code. Other examples of events that trigger decoding the first 2D matrix code are also possible.

The data recovered from a 2D matrix code can include an identifier or address of a computing device that can retrieve data associated with a panel component from data storage device 108 or information identifying the panel component. Additionally or alternatively, data storage device 106 can store the identifier or address of a computing device that can retrieve data associated with a panel component from data storage device 108 such that a 2D matrix codes associated with the panel components do not have to include the identifier or address.

Figure 10:
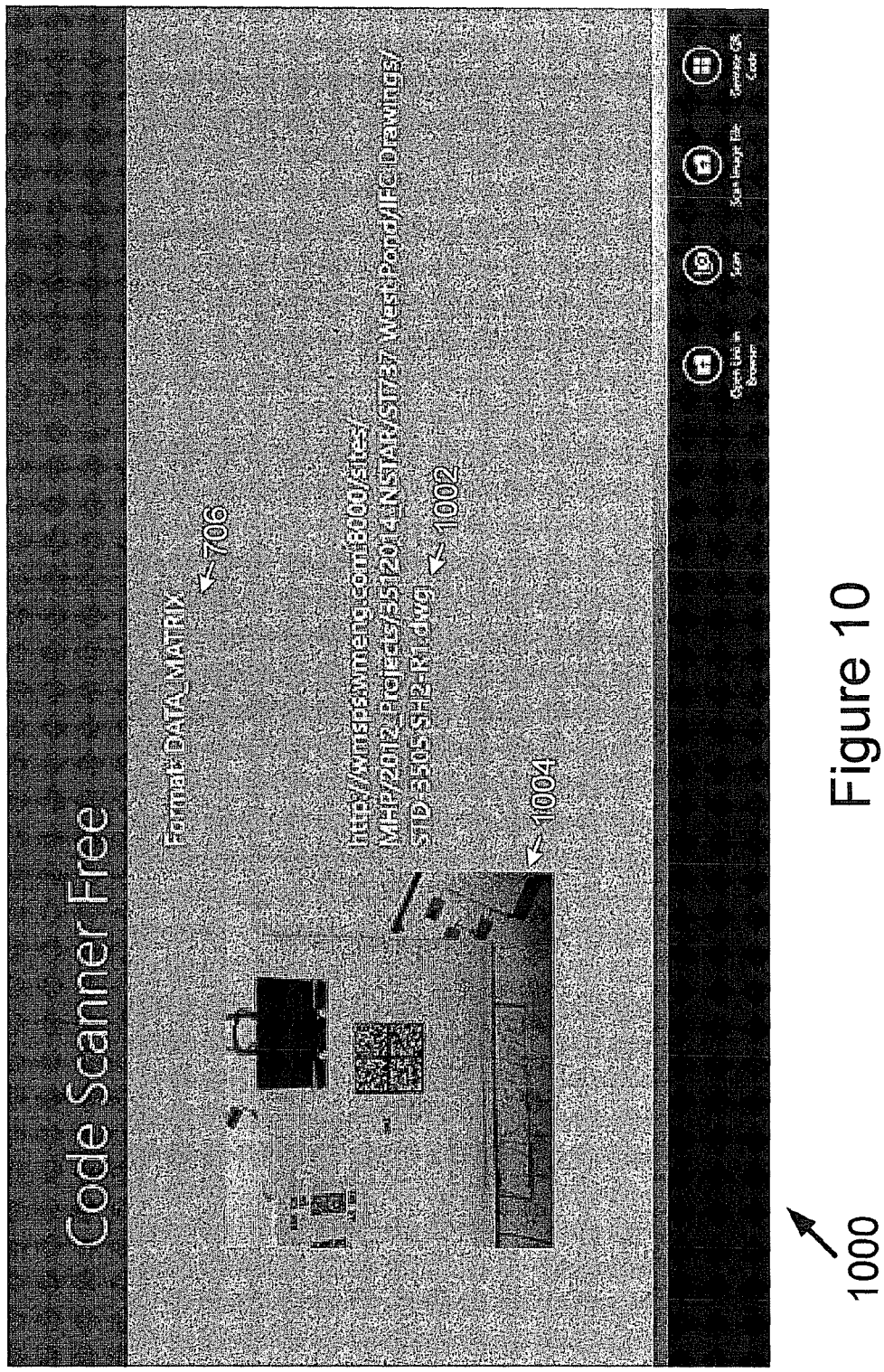
FIG. 10 shows an example screen shot displayable by a display device of a capture device.

Next, block 406 includes transmitting, from the capture device 102, at least a portion of the recovered first data. Transmitting the at least a portion of the recovered first data can include processor 104 executing program instructions of CRPI 125 to cause communication device 112 to transmit the at least a portion of the recovered first data to network 116 using at least one of wired communication link 118 and wireless communication link 120 for transmission to a computing device that can retrieve information associated with the first panel component associated with the first 2D matrix code. As an example, the at least a portion of the recovered first data can comprise a uniform resource locator (URL) from which panel component information, associated with the 2D matrix code, can be retrieved. FIG. 10 shows an example URL 1002 that can be encoded within a 2D matrix code.

Transmitting the at least a portion of the data recovered from a 2D matrix code can include transmitting all of the recovered data. On the other hand, processor 104 can execute program instructions of CRPI 125 to select which portion less than all of the recovered data is transmitted. Selection of the portion of the recovered matrix data can be determined in response to use of user interface device 110 to receive a selection of the portion of the recovered data. As an example, the recovered data can identify multiple types of information associated with the first panel component that can be retrieved from data storage device 108, such as a test plan, an electrical wiring schematic, and an owner's manual. User interface device 110 can visually present the list and receive a selection of some or all of the information identified in the list for requesting from data storage device 108.

Next, block 408 includes receiving, by the capture device 102, second data associated with the first panel component. Receiving the second data can comprise communication device 112 receiving second data that is transmitted over network 116. In that regard, receiving the second data can include receiving the second data using wired communication link 118 or wireless communication link 120. Upon, during, or after receiving the second data, communication device 112 can transmit the received second data to one or more elements of capture device 112, such as processor 104, data storage device 106, or user interface device 110.

As an example, the second data can comprise an operation manual, an electrical wiring schematic, a product specification, a test plan, a video file, an audio file, or some portion of one or more of those associated data. The second data can include or accompany data indicating the capture device 102 is a destination for the second data. Some or all of the second data can be encrypted. Processor 102 can execute CRPI 125 to decrypt second data that is encrypted.

Next, block 410 includes capturing, by the capture device 102, a second 2D matrix code associated with a second panel component. The second 2D matrix code can comprise a quick response (QR) code or another type of multi-dimension 2D matrix code. The second panel component can, for example, comprise any of the panel components identified in this description. Capturing the second 2D matrix code can include capture component 105 capturing an image of the second 2D matrix code. Capture component 105 can provide the image of the second 2D matrix code for storage within data storage device 106.

Next, block 412 includes decoding, by the capture device 102, the second 2D matrix code to recover third data encoded within the second 2D matrix code. Decoding the second 2D matrix code can comprise processor 104 executing program instructions of CRPI 125 to decode the second 2D matrix code. In one respect, decoding the second 2D matrix code can occur automatically in response to capturing of the second 2D matrix code. In another respect, decoding the second 2D matrix code can occur in response to user interface device 110 being used to enter a selection to decode the second 2D matrix code. Other examples of events that trigger decoding the second 2D matrix code are also possible.

Turning to FIG. 5, block 414 includes transmitting, from the captured device 102, at least a portion of the recovered third data. Transmitting the at least a portion of the recovered third data can include processor 104 executing program instructions of CRPI 125 to cause communication device 112 to transmit the at least a portion of the recovered third data to network 116 using at least one of wired communication link 118 and wireless communication link 120 for transmission to a computing device that can retrieve information associated with the second panel component associated with the second 2D matrix code.

Next, block 416 includes receiving, by the capture device 102, fourth data. Receiving the fourth data can comprise communication device 112 receiving fourth data that is transmitted over network 116. In that regard, receiving the fourth data can include receiving the fourth data using wired communication link 118 or wireless communication link 120. Upon, during, or after receiving the fourth data, communication device 112 can transmit the received fourth data to one or more elements of capture device 112, such as processor 104, data storage device 106, or user interface device 110.

The fourth data can comprise data associated with the second panel component. As an example, the data associated with the second panel component can comprise an operation manual, an electrical wiring schematic, a product specification, a test plan, a video file, an audio file, a training video, an operating procedure (such as a standard operating procedure), a quality manual, safety procedures, a material safety data sheet, an arc-flash safety warning, functional requirement specifications, a user requirement specification, a validation certificate, a material verification data sheet, a detail data specification, an ISA instrument sheet, an instrument calibration sheet, an instrument calibration procedure, a factory acceptance test plan, a site acceptance test plan, an end-to-end operational test, disturbance monitoring and fault data, a COMTRADE file, IEEE C37.111 standards, a national electric code, a hazardous area classification warning, or some portion of one or more of those associated data. The fourth data can include or accompany data indicating the capture device 102 is a destination for the fourth data. Some or all of the fourth data can be encrypted. Processor 102 can execute CRPI 125 to decrypt fourth data that is encrypted.

Next, block 418 includes presenting, by the capture device 102, an indication of the fourth data. Presenting the indication of the fourth data can comprise user interface device 110 visually, audibly, or haptically presenting the indication of the fourth data. As an example, the fourth data can indicate connection of the first panel component to the second panel component is a correct connection. As another example, the fourth data can indicate connection of the first panel component to the second panel component is an incorrect connection. If the fourth data indicates an incorrect connection, the fourth data can also include data indicating correct connections for the first panel component or the second panel component.

IV. Example Data Matrix Code Creation

A person having ordinary skill in the art will understand that one or more of the example embodiments can be used with a one-dimensional bar code, such as a standard code 39 bar code instead of a 2D matrix code. For instance, for some panel components, typically panel components to or on which a large (such as a 4 inch by 4 inch) panel component label can be attached, a standard code 39 barcode label could be used in addition to or in alternative to a 2D matrix code.

With the goal of encoding an increased amount of information into a code associated with a panel component, the size of a standard code 39 bar code can become too large to apply to relatively smaller panel component tags and labels. 2D matrix codes allow for encoding the increased amount of information and for applying to the relatively smaller panel component tags and labels. As an example, using a 2D matrix code, a 2 inch panel label provides for placement of about 20 alphanumerical characters on the label in addition to the 2D matrix code. As another example, using a 2D matrix code, a larger front panel label provides for placement of about 100 alphanumerical characters on the label in addition to the 2D matrix code.

As an example, a 2D matrix code, such as an electronic QR code file, can be created using a combination of multiple inputs and operator activities (see, FIG. 17, block 1706) When a Project Site is created in a Document Management System (DMS), such as SharePoint, a URL can be created to locate an initial Welcoming Page that contains all the individual documents, records, library, data, etc. for the project (see, FIG. 17, data storage device (108) and block 1708). An administrator of the Project Site within the DMS then imitates a Workflow Task which creates a database specifically used to hold Electronic copies of the 2D matrix codes generated for that specific Welcoming Page as well as any other 2D matrix code that is to be created later in that project.

2D matrix codes can comprise codes having black and white "cells" or modules commonly called Data Matrix Code or QR Code and can be used for data input onto a printed label or tag. The 2D data code can be used for printing onto a label or tag. Common identifiers of the printed 2D data code can include, but are not limited to, wire numbers, equipment identifiers, and related associated stored documents and records.

Creating the 2D data code can be a batch process, which can be automated by the use of a compiled computer code such as Basic, "Visual C," VB Basic, or SharePoint's Workflow. The individual creation process uses a Document Management and Record system such as Microsoft Corporation's SharePoint. Inputs for creating a 2D data code can include, but are not limited to, the following inputs: (i) PDF files, (ii) Data Matrix Code Identifier 2D matrix file (2Dimensional Codes such as QR and Matrix Codes), (iii) AutoCAD Drawing files, (iv) MS Word Documents, (v) MS Excel Spread sheets, (vi) MS SQL Server Database, or (vii) computer code for a specific application in a file and document format. These example inputs can describe items such as, but not limited to, (i) purchase orders, (ii) ISA calibration and data sheets, (iii) functional requirement specifications (FRS) & sequence of operations, (iii) project plan Gantt chart, (iv) operator and maintenance manuals, or (v) training video files.

Once a typical electronic file is placed into the DMS, such as SharePoint, the document location has a location identifier called a URL code and sometimes commonly identifies as a WEB page location. The document is now located in the DMS server as a WEB address. The DMS, such as SharePoint, can allow these documents to be combined in to sites, using site pages, libraries, workflow tasks, links and other workspaces. A project, once it is created by either Manufacturing or Engineering, can create a Site Web Project Page with a "Flash Page" sometimes called the "Welcoming Page" for that Project in the DMS. That page is accessible using the URL and then is transferred to the data base that is to be used to create an Electronic 2D Matrix Code (see, FIG. 17, block 1706). The encoded 2D Matrix Code includes the Hyperlink URL address as a printed and readable component of the 2D Code.

In addition other documents such as a list of wire label numbers from the AutoCAD database or from a Spread sheet is stored in the DMS. These lists also have a URL that can then be used to create an electronic 2D matrix code.

Creating a specific 2D matrix code can be initiated by an operator of the 2D matrix code label or tag printer. The operator can initiate the batch process and identify the items to be printed. The batch code using the software described above then obtains the web address (URL) of the document in the DMS to be coded in the Label. The Electronic QR or Data Matrix Code is created. If a string of values are also to be added to the Label, the batch process then obtains the SharePoint Document with the values such as from a Spreadsheet and then includes these values, one at a time or in groups, as required on to the Printed Label. The printer operator confirms that the correct information has been obtain by the program from SharePoint and then allows the printer to batch print the 2D Matrix or QR Code Labels using the printer manufacturer's printing software.

After creation, the label file(s) can be stored electronically or otherwise in the DMS as a part of a document record for use as a search feature in the DMS as a metadata point or some other form of advance search criteria. In particular, the label file information can be stored electronically or otherwise in data storage device 108 until it is ready to be sent to a program to create and print a 2D matrix code. For instance, the label file information can be created and placed into a relational database using the data from an electronic file just before it is sent to the matrix code creation software for data formatting into the actual process of printing or etching. Storage of the label file(s) can depend on the software used to generate the 2D matrix code. The label file(s) can be stored as objects including, but not limited to, a picture, a JPG file, a label matrix code file, or a label identifier.

The relational database, storable within data storage device 108, can have information fields of which one is an index key-field. Once a value is assigned to any index key-field, that value typically does not change. At the same time, it is possible to create an electronic copy of the matrix code squares as a JPG file. The JPG or other formatted picture file can then be transferred as an object to a printer or laser etcher as any other object is transferred to one of those devices. In accordance with some embodiments, the JPG or other picture file of the 2D matrix code is not stored for further use after printing or etching the 2D matrix code. In other example embodiments, the JPG or other picture file of the 2D matrix code can be stored electronically or otherwise for further use after printing or etching the 2D matrix code.

V. Example Label Creation

Figure 18:
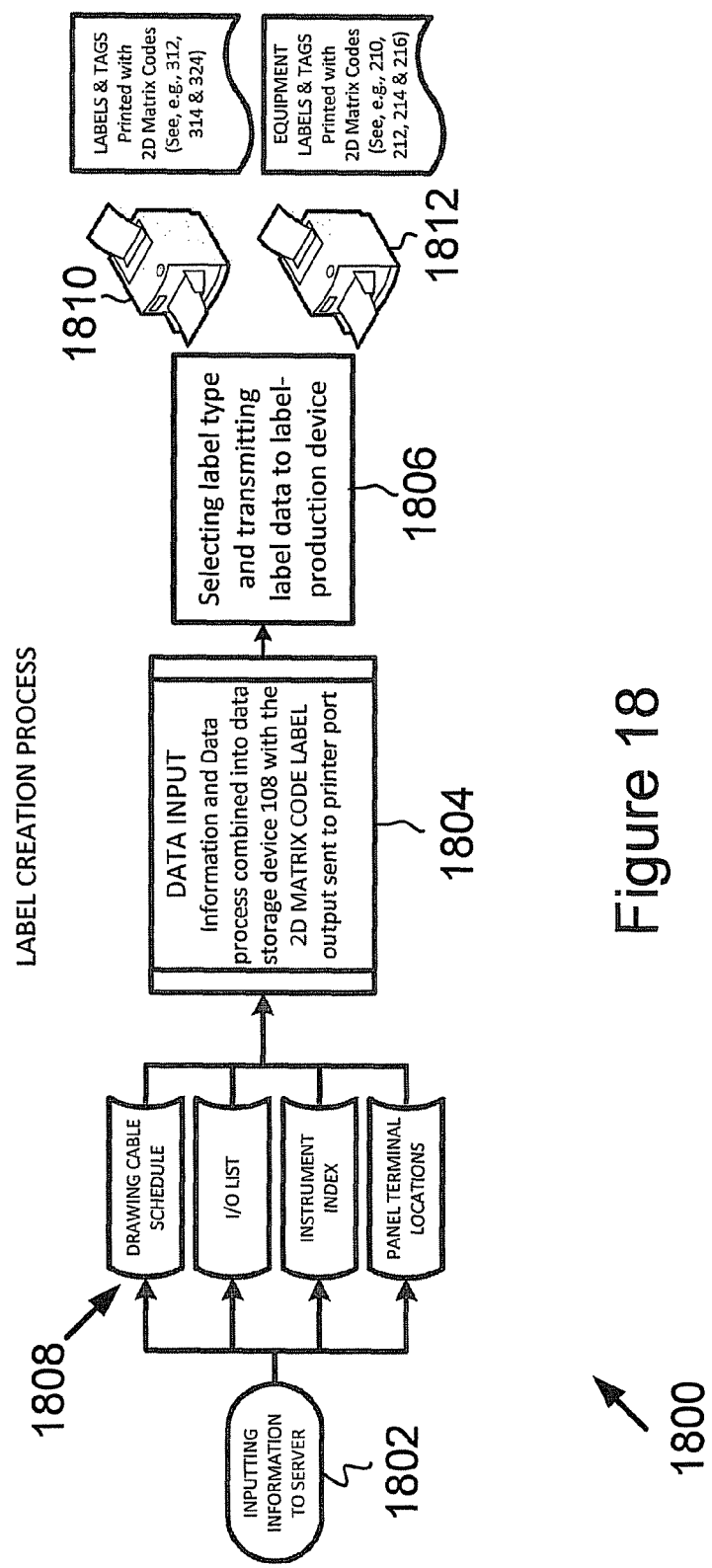
FIG. 18 depicts a flowchart showing a set of functions that can be carried out in creating labels with two-dimensional matrix codes.

FIG. 18 depicts a flowchart showing a set of functions 1800 (or more simply, "the set 1800") that can be carried out in accordance with one or more example embodiments described herein to create labels with 2D matrix codes. The functions of the set 1800 are shown within blocks labeled with even numbers between 1802 and 1806, inclusive. Each function of the set 1800 can be performed by an element or a combination of elements of system 100.

Block 1802 includes inputting information to server. As an example, using data entry device 126, a user can input information such as the information items 1808 shown in FIG. 18 or some other information. Data entry device 126 can transmit the information to server device 128 for subsequent storage within data storage device 108, or directly to data storage device 108.

Block 1804 includes processing the input information. Processing the input information can be carried out by server device 128. Processing the input information can include associating the input information with a 2D matrix code and a panel component to which the input information is applicable. Some input information, such as an operation and maintenance manual URL, can be associated with multiple panel components.

Block 1806 includes selecting a label type and transmitting label data to a label-production device. As shown in FIG. 18, the label production device can comprise a printer, such as printer 1810 or 1812. As an example, printer 1810 can be configured to produce labels and tags with 2D matrix codes (such as 2D matrix codes 312, 314, and 324). As another example, printer 1812 can be configured to produce labels and tags for equipment with 2D matrix codes (such as matrix codes 210, 212, 214, and 216).

Figure 14:
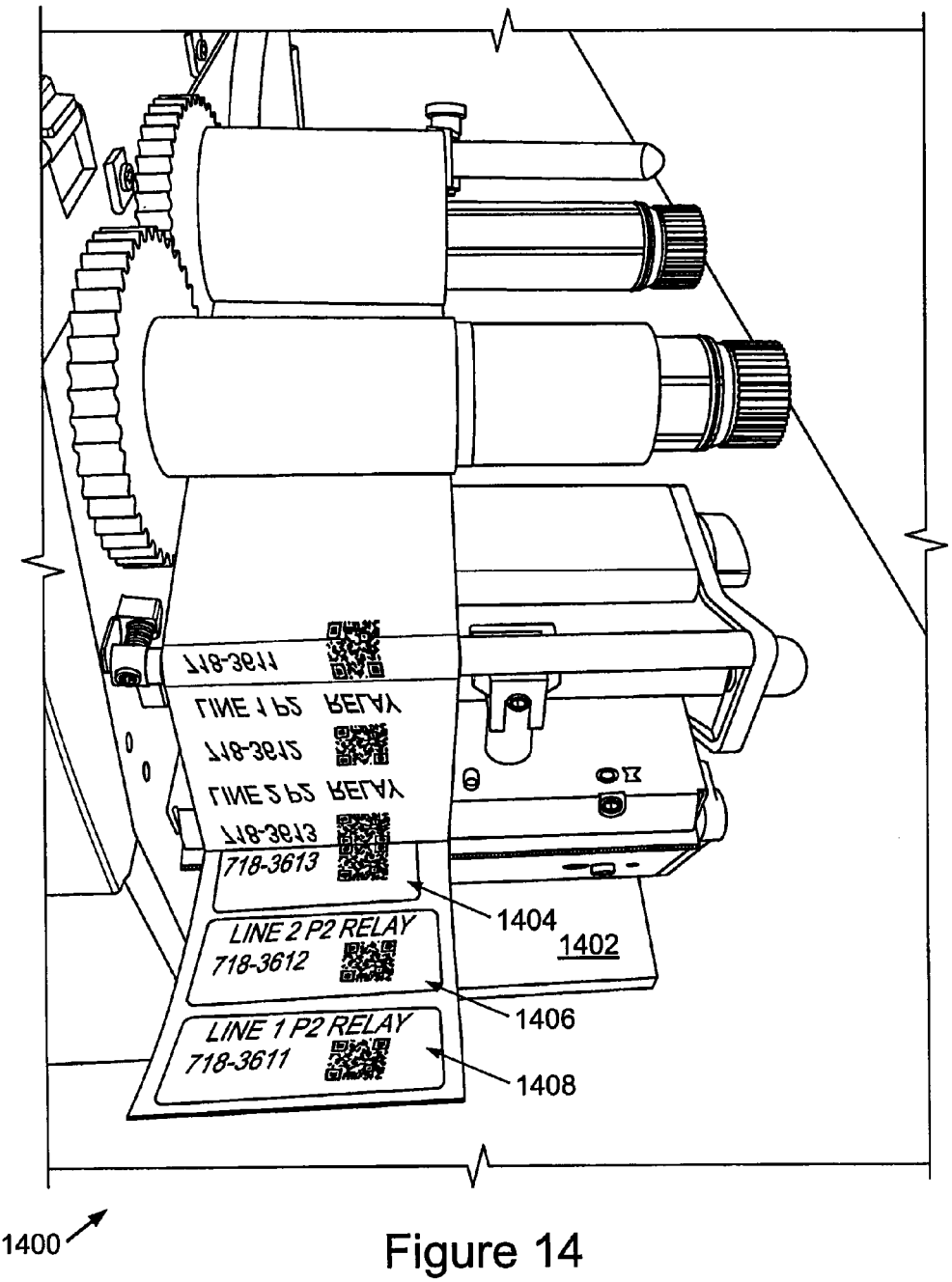
FIG. 14 is an image of an example printer configured to print adhesive labels for affixing to panel components.

FIG. 14 shows an image 1400 of an example printer 1402 configured to print adhesive labels for affixing to panel components. FIG. 14 also shows example labels 1404, 1406, and 1408. Each of those labels includes a respective 2D matrix code and an alphanumeric identifier. As an example, labels 1404, 1406, and 1408 can be printed for affixing to panel components such as a relay or conductors configured for connection to the relay. Printer 1810 or printer 1812 can be configured like printer 1402 or to print labels like labels 1404, 1406, and 1408. Transmitting label data to the label production device can include transmitting label data for multiple labels so that multiple labels can be produced in a single batch. See, FIG. 17, block 1718 for creating data instructions for printer to print labels that are delivered in block 1720 to technicians.

Selecting a label type at block 1806 can include selecting label etching. In that regard, transmitting the label data to the label production device can include transmitting the label data to an etching device configured to etch 2D matrix codes into panel components.

Figure 24:
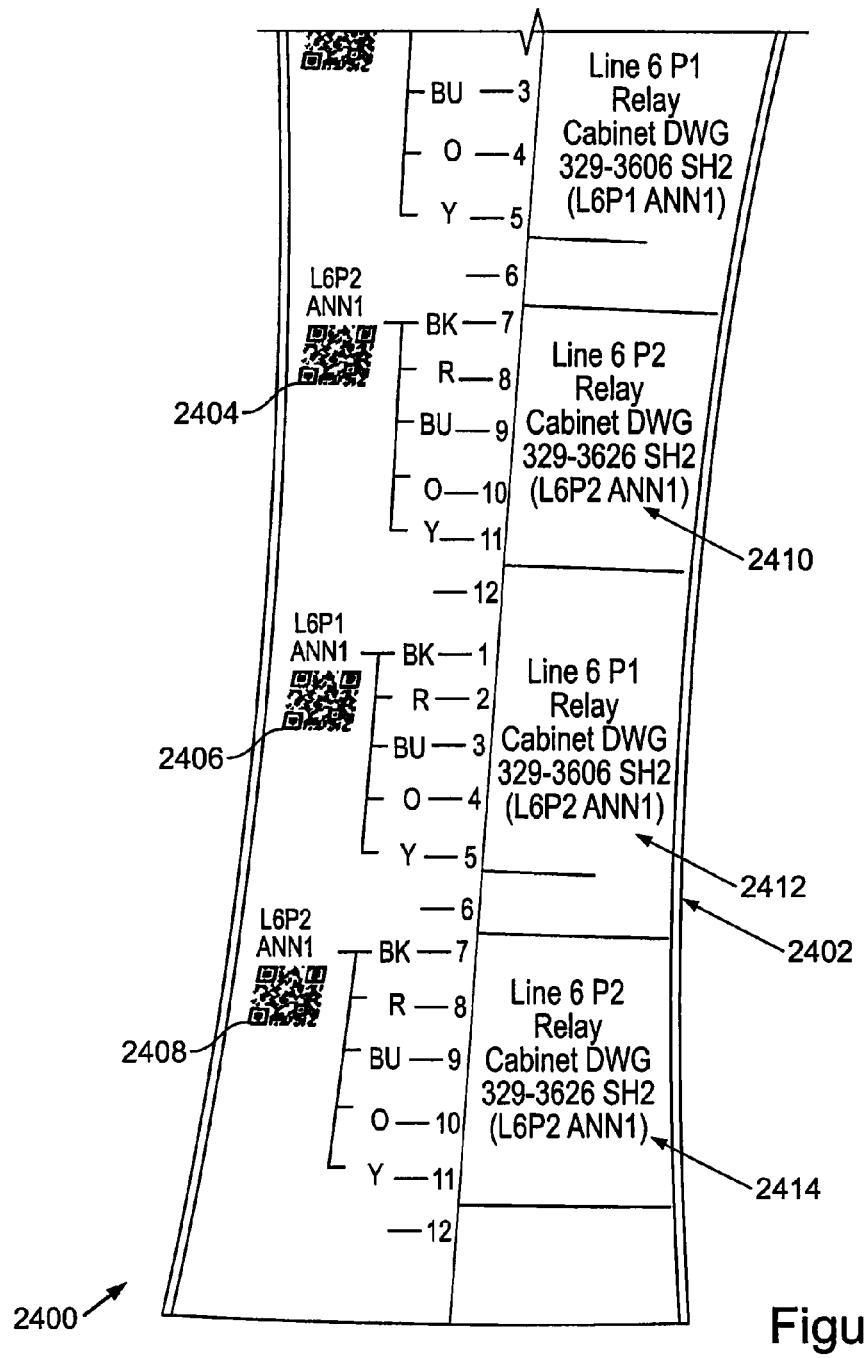
FIG. 24 is an image that shows an adhesive label material onto which labels for affixing to terminal block wings have been printed.
Figure 25:
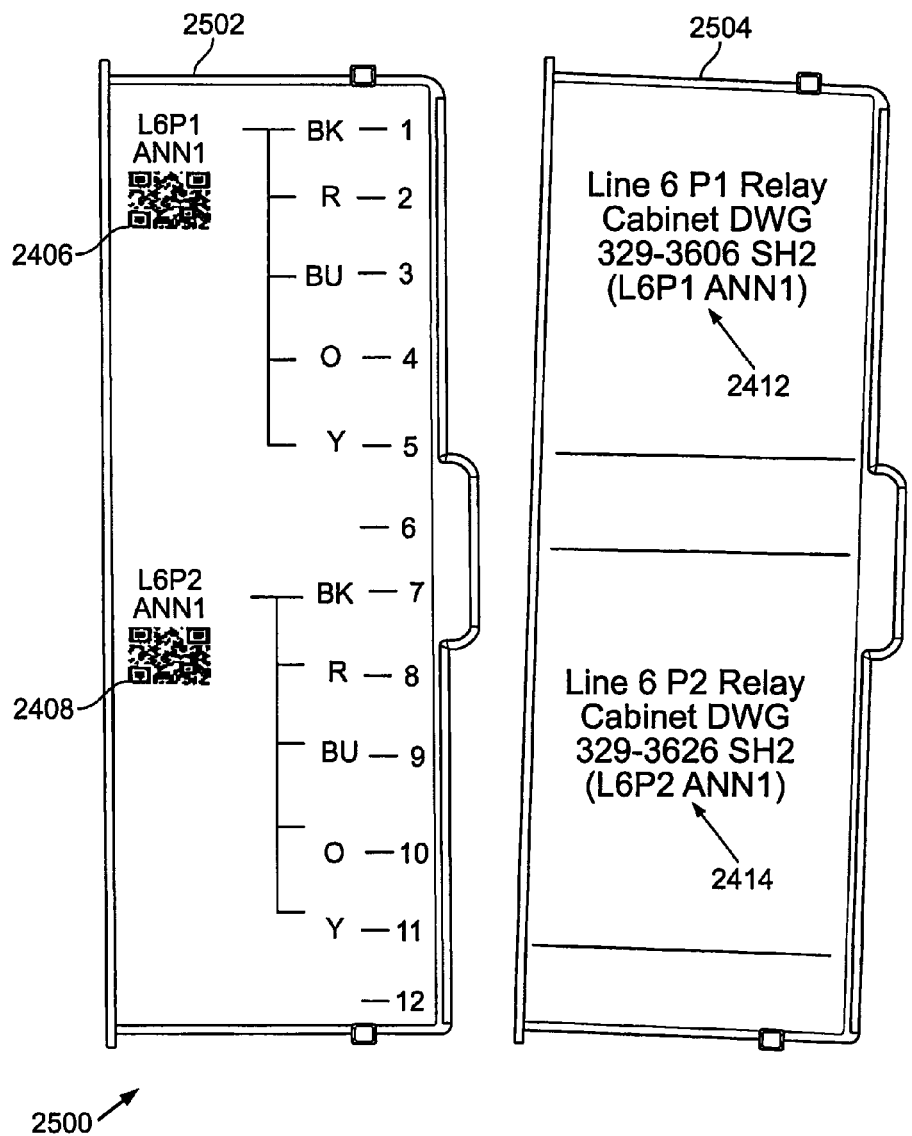
FIG. 25 is an image that shows example terminal block wings.

FIG. 24 is an image 2400 that shows an adhesive label material 2402 onto which labels for affixing to terminal block wings have been printed. A terminal block wing is configured for attaching to a terminal block, such as terminal block 302 shown in FIG. 3 or terminal blocks 812, 814, or 816 shown in FIG. 8. FIG. 25 is an image 2500 that shows terminal block wings 2502 and 2504.

A label 2506, obtained from label material 2402 and having 2D matrix codes 2406 and 2408, is affixed to terminal block wing 2502. Label 2506 includes terminal numbers, such as 1 through 12, and color abbreviations, such as BK, R, BU, O, and Y, indicating the color of insulators surrounding conductors to be attached at the respective terminal number. Label 2508 includes terminal numbers, such as 1 through 12, and color abbreviations, such as BK, R, BU, 0, and Y, indicating the color of insulators surrounding conductors to be attached at the respective terminal number. A label 2508, obtained from label material 2402 and having alphanumeric descriptors 2412 and 2414, is affixed to terminal block wing 2504. Labels having a 2D matrix code 2404 and alphanumeric descriptor 2410 have also been printed onto label material 2402. In an alternative arrangement, some or all of the information on label 2506 (including 2D matric codes 2406 and 2408), information on label 2508, or some other information can be etched into a terminal block wing 2502 or 2504.

VI. Example Labeling

Figure 19:
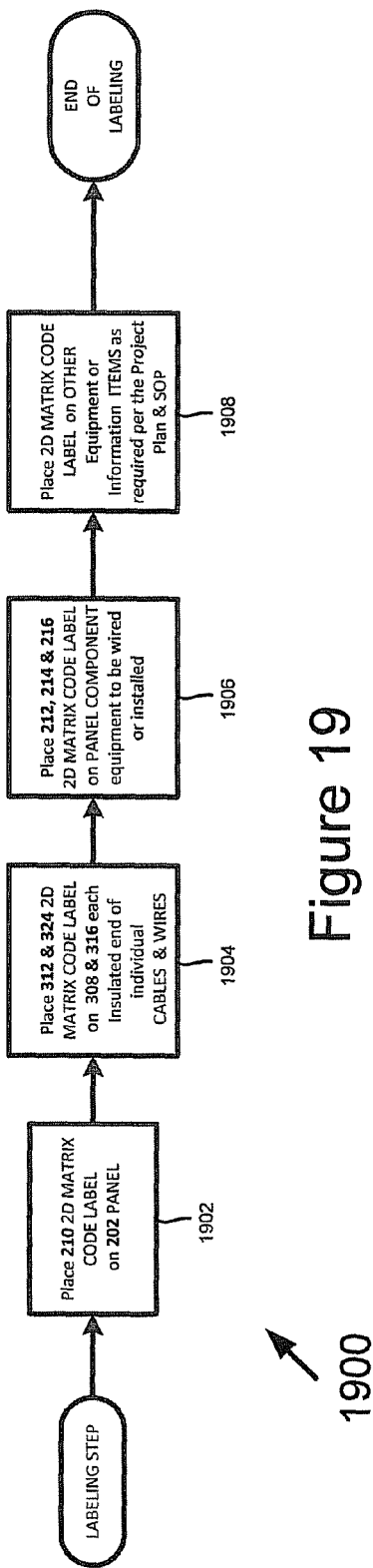
FIG. 19 depicts a flowchart showing a set of functions for labeling panel components with labels on panel components.

Next, FIG. 19 depicts a flowchart showing a set of functions 1900 (or more simply "the set 1900" that can be carried out to label panel components with labels having 2D matrix codes associated with panel component information. The functions of the set 1900 are shown within blocks labeled with even numbers between 1902 and 1908, inclusive. One or more functions of the set 1900 can be performed to any of a variety of panel component or field component.

Block 1902 includes placing a 2D matrix code label on a panel. As an example, a label or tag with 2D matrix code 210 can be placed upon a panel 202. Next, block 1904 includes placing a label or tag with a 2D matrix code on each insulated end-portion of panel components such as cables and wires. As an example, labels or tags 312 and 324 can be placed on the insulated end-portion of conductors 308 and 316, respectively. Next, block 1906 includes placing a label or tag with a 2D matrix code on a panel component or field component. As an example, labels or tags with 2D matrix codes 212, 214, and 216, can be placed on panel components, 204, 206, and 208, respectively. Placing a label or tag with a 2D matrix code on a field device can include placing the label or tag on a device such as a field installed device 2328 (shown in FIG. 23). Next, block 1908 includes placing a label or tag with a 2D matrix code on any other item specified by construction plans or standard operating procedure of an entity constructing the panel.

VII. Example Panel Construction

Figure 20:
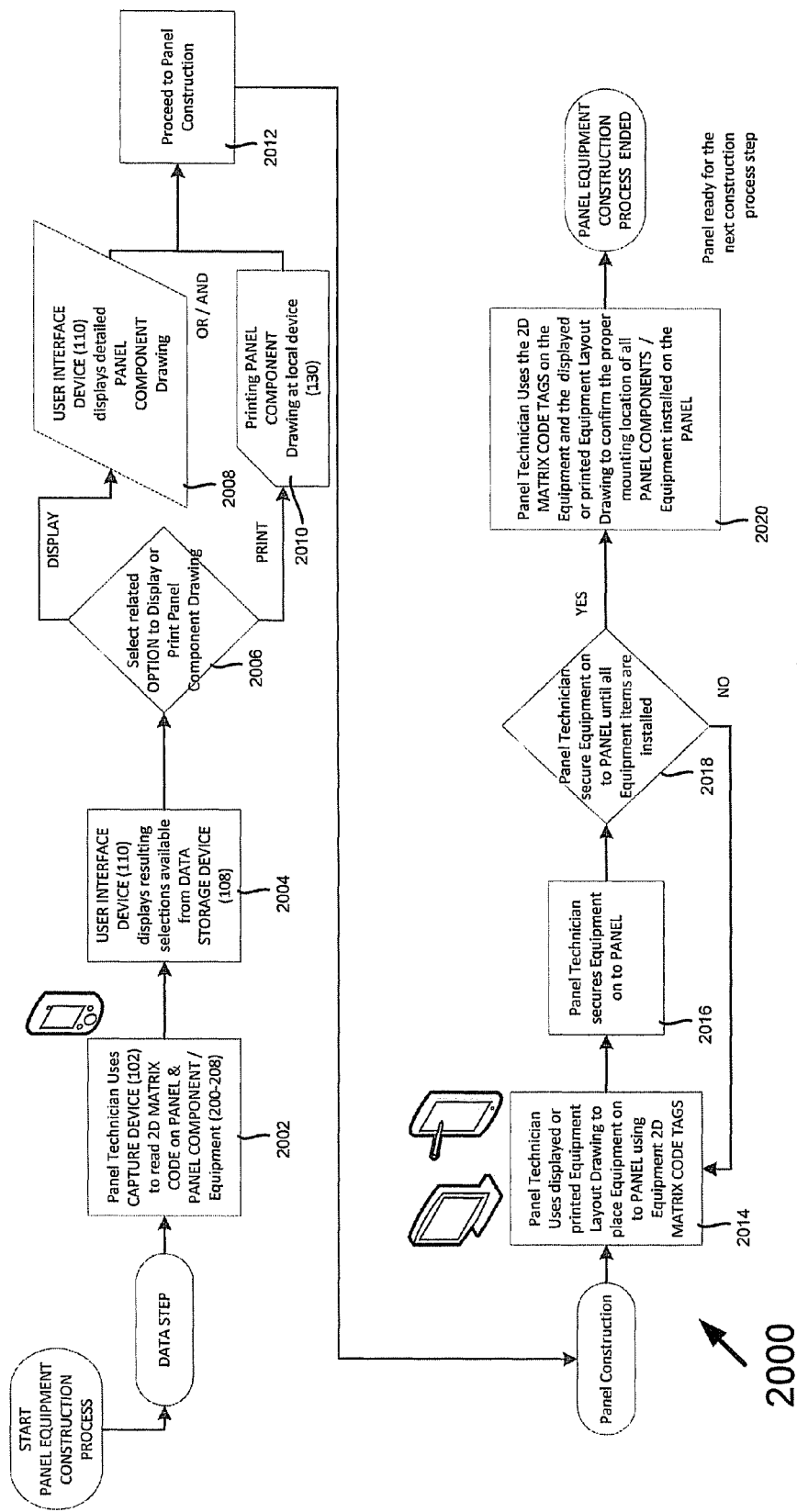
FIG. 20 is a flow chart showing example functions for using a two-dimensional matrix code to aid in the placing of panel components into a panel.

FIG. 20 depicts a flow chart showing a set of functions 2000 (or more simply, "the set 2000") for using a two-dimensional matrix code to aid in the placing of panel components into a panel. The functions of the set 2000 are shown within blocks labeled with even numbers between 2002 and 2020, inclusive.

Block 2002 includes reading or capturing, using capture device 102, a 2D matrix code on a panel or panel component, such as one of 2D matrix codes 210 through 216. Block 2004 includes displaying, using capture device 102 or user interface device 110, selections associated with the 2D matrix code captured at block 2002 and received from data storage device 108. Data storage device 108 can provide the selections in response to receiving at least a portion of data encoded within the captured 2D matrix code. The information selections can comprise selections to receive information regarding the panel or panel component associated with the captured 2D matrix code.

Block 2006 includes receiving a selection option to display or print a panel component drawing. The panel component drawing can include information pertaining to installing the panel component within or to the panel. If the displaying of the panel component drawing is selected at block 2006, continuing at block 2008, user interface device 110, capture device 102 or local device 130, displays the panel component drawing. If the printing of the panel component drawing is selected at block 2006, continuing at block 2010, local device 130, prints the panel component drawing provided by capture device 102. Selecting both the print and display options can occur. Block 2012 includes proceeding to panel construction.

Block 2014 includes displaying the panel component drawing using user interface device 110, capture device 102 or local device 130 or using the printed panel component drawing to guide placement of and securing of panel components within or to the panel.

Block 2016 includes securing (for example, connecting or attaching) panel equipment or component to the panel being constructed. Block 2018 includes determining whether all panel equipment or components are secured to the panel. If additional panel equipment or panel components are to be secured to the panel, the set 2000 can continue at block 2014 for a next panel component or equipment. After determining all panel equipment or components are secured to the panel at block 2018, at block 2020, capture device 102 can provide for comparison of 2D matrix codes on the panel, on the panel components, and printed drawings to confirm the panel components are properly secured within or to the panel. Alternatively, that comparison can occur for select components prior to securing all panel equipment or components within or to the panel.

VIII. Example Wire Construction

Figure 21:
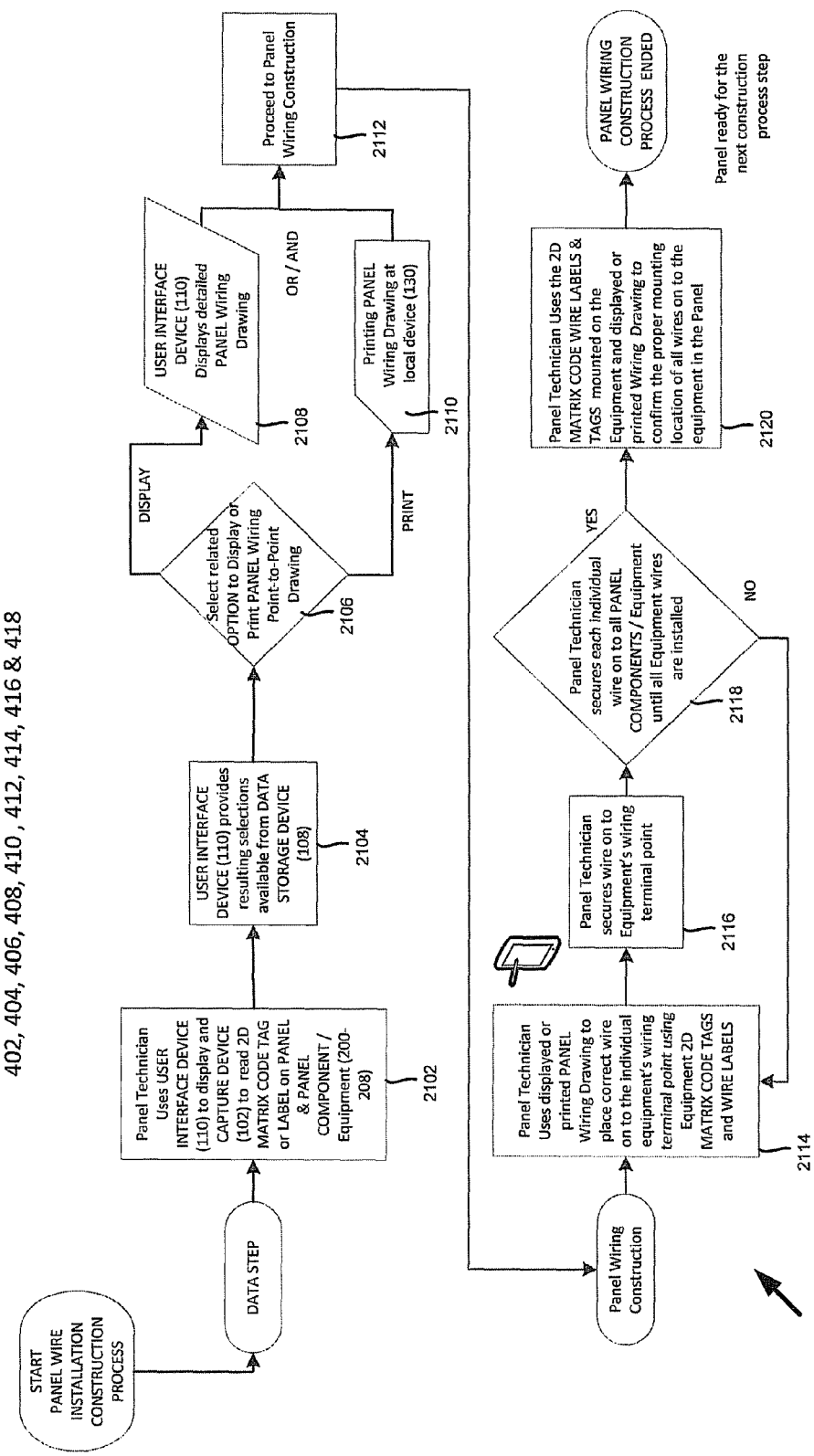
FIG. 21 is a flow chart showing example functions for using two-dimensional matrix code to aid in the placing of wires onto the panel components.

FIG. 21 depicts a flow chart showing a set of functions 2100 (or more simply, "the set 2100") for using two-dimensional matrix code to aid in the placing of wires onto the panel components. The functions of the set 2100 are shown within blocks labeled with even numbers between 2102 and 2120, inclusive.

Block 2102 includes reading or capturing, using capture device 102, a 2D matrix code on a panel or panel component, such as one of 2D matrix codes 210 through 216. Block 2104 includes displaying, using capture device 102 or user interface device 110, selections associated with the 2D matrix code captured at block 2102 and received from data storage device 108. Data storage device 108 can provide the selections in response to receiving at least a portion of data encoded within the captured 2D matrix code. The information selections can comprise selections to receive information regarding the panel or panel component associated with the captured 2D matrix code.

Block 2106 includes receiving a selection option to display or print a panel component drawing. The panel component drawing can include information pertaining to installing the panel component within or to the panel. If the displaying of the panel wiring point-to-point drawing is selected at block

2106, continuing at block 2108, user interface device 110, capture device 102 or local device 130, displays the panel wiring point-to-point drawing. If the printing of the panel wiring point-to-point drawing is selected at block 2106, continuing at block 2110, local device 130, prints the panel wiring point-to-point drawing provided by capture device 102. Selecting both the print and display options can occur. Block 2112 includes proceeding to panel wiring construction.

Block 2114 includes displaying the panel wiring point-to-point using user interface device 110, capture device 102 or local device 130 or using the printed panel wiring point-to-point to guide wiring of panel components and equipment to termination points within the panel.

Block 2116 includes securing (for example, connecting or attaching) wiring on or to a terminal point of the panel equipment or component. Block 2118 includes determining whether all panel equipment or component wiring is installed within the panel. If additional panel equipment or panel component wiring is to be installed, the set 2100 can continue at block 2114 for a next panel component or equipment wiring to be connected to terminal points. After determining all panel equipment or component wiring is installed within the panel at block 2118, at block 2120, capture device 102 can provide for comparison of 2D matrix codes on the panel, on the panel component wiring, and printed drawings to confirm the panel component wiring is properly connected within or to the panel. Alternatively, that comparison can occur for select component wiring prior to installing all panel equipment or component wiring within or to the panel.

IX. Example Quality Assurance (QA) and Quality Control (QC)

Figure 22:
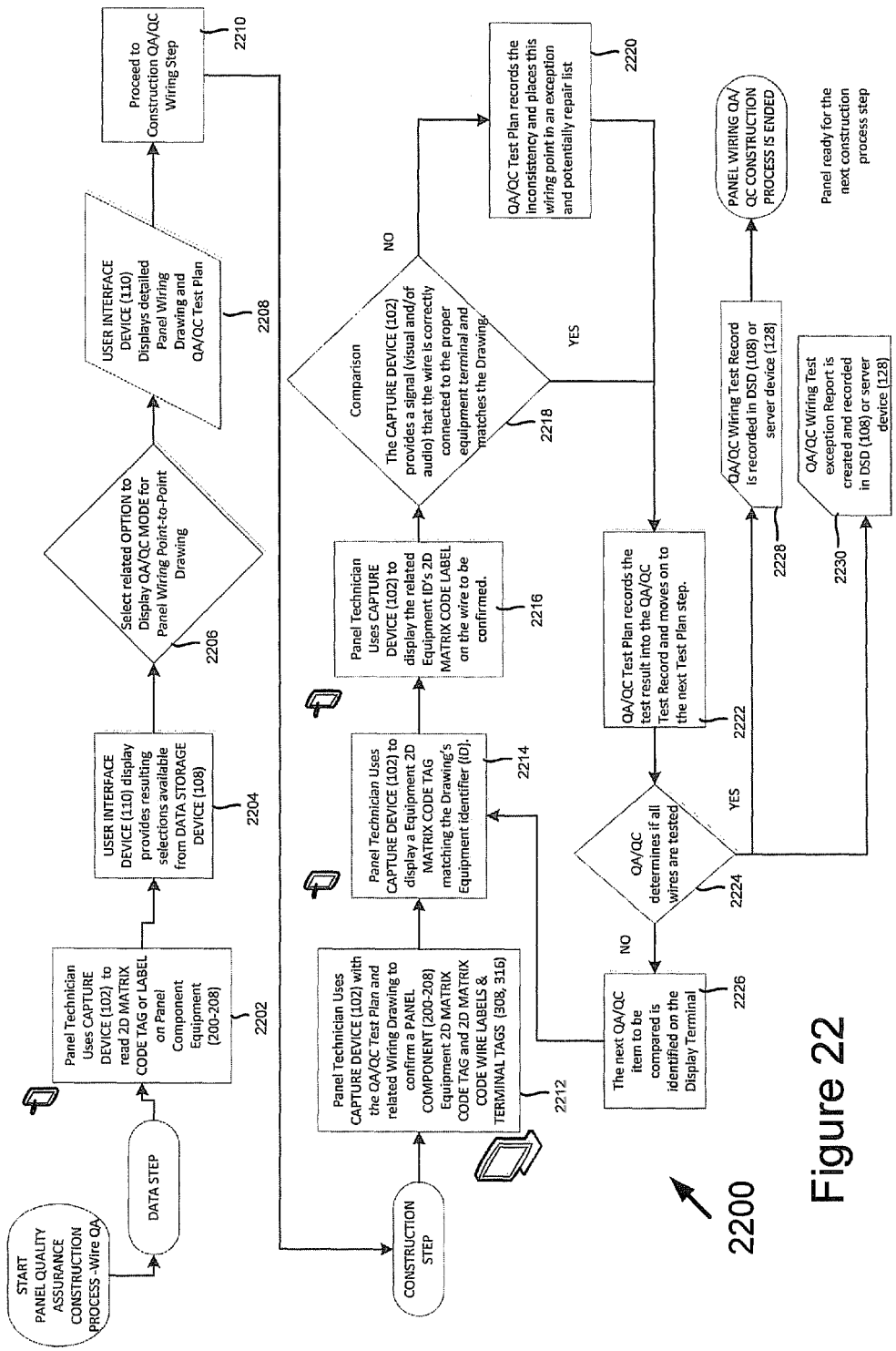
FIG. 22 is a flow chart showing example functions for using a two-dimensional matrix code to aid in the quality process and testing of panel wiring and connections.

FIG. 22 depicts a flow chart showing a set of functions 2200 (or more simply, "the set 2200") for using a two-dimensional matrix code to aid in the quality process and testing of panel wiring and connections. The functions of the set 2200 are shown within blocks labeled with even numbers between 2202 and 2230, inclusive.

Block 2202 includes reading or capturing, using capture device 102, a 2D matrix code associated with a panel component or equipment. The 2D matrix code, such as 2D matrix code 210 on panel 202 shown in FIG. 2, can identify a particular panel, portion of a panel, or panel component.

Block 2204 includes displaying, using user interface device 110 or capture device 102, selections of information and options associated with the captured 2D matrix code that can be downloaded from data storage device 108. As an example, the displayed selections and options can include an option to display a QA or QC mode pertaining to panel wiring point-to-point drawing. Block 2206 includes selecting to display the QA/QC mode. Local device 130 can display the information and options displayable using user device 110.

Block 2208 includes displaying, using user interface device 110 or capture device 102, a panel wiring drawing and QA/QC test plan. The test plan can be associated with the panel or panel components associated with the 2D matrix code captured at block 2202. Block 2210 includes processing to a construction QA/QC step. The construction step can be the initial construction of the panel or subsequent construction activity, such as rebuilding or updating the panel.

Block 2212 includes using capture device 102 and the retrieved QA/QC test plan to confirm proper connection of two panel components or to determine improper connection of those two panel components.

Block 2214 includes displaying, using the capture device 102, a 2D matrix code captured from a first panel component, such as a 2D matrix code on a conductor to be connected or connected to the first panel component.

Block 2216 includes displaying, using the capture device 102, a 2D matrix code captured from a second panel component, such as a 2D matrix code on a conductor to be connected or connected to the first panel component.

Block 2218 includes providing, using capture device 102, a signal (for example, visual, audible, or haptic) indicating whether a conductor (for example, a copper wire or fiber optic cable) is connected to the proper panel component or equipment terminal and matches a drawing or electronic file defining connection of the panel component and conductor. Processor 104 can execute program instructions of CRPI 125 to make a comparison of 2D matrix codes, or data encoded therein, associated with the conductor and panel component. Alternatively, server device 128 or another computing device can make the comparison and inform capture device 102 an outcome of the comparison. The comparison can reduce or eliminate erroneous panel component and conductor connections.

In an example panel, panel components, such as equipment and wires, can be associated with a 2D matrix code. The associated 2D matrix code can be located on a label or tag attached or affixed to the panel component. For example, wires, cables and other connection items can have 2D matrix code labels. Each individual wire can have a specific 2D matrix code wire label including data such as, but not limited to, a wire number, a panel URL web address, an identifier, or other information as needed. The information on the label or encoded within the 2D matrix code can be displayed using capture device 102.

The DMS at data storage device 108 can store data accessible by a URL address and an identifier, such as a wire number. For instance, a data spreadsheet can have or be associated with a WEB address or URL to locate that specific spreadsheet and view each field of the spreadsheet/database containing a wire number. The wire number can be related to an AutoCAD data base identifying an equipment ID and wires connected to that terminal block as listed in a point-to-point wiring diagram.

Using a Workflow task and incorporating the Workflow into the Wiring QA/QC Test Plan, a Workflow process is used to make comparisons between the drawings and the installed wires. When the Wiring QA/QC test plan is activated in SharePoint, each test of the process is initiated. This is an interactive activity.

A quality technician starts the QA/QC wiring test plan using the capture device to retrieve a test plan document. After some initial administrative activities such as login and other items, the first instruction is presented to the quality technician. The quality technician scans a major equipment matrix tag to confirm that the panel and the test plan are the correct quality components. When the information is compared in the workflow, an audible or visual indicator is presented to the quality technician. This information can be recorded in the SharePoint database. The next page of the QA/QC Wiring test plan is displayed.

The quality technician can scan a 2D matrix code in the panel or on the panel component and then a 2D matrix code corresponding to a terminal block wire label. If the two scanned 2D matrix codes match, data indicating a successful comparison can be recorded in data storage device 108. Furthermore, an audible or visual indicator can be provided by capture device 102 to prompt the quality technician to go to the next terminal block and panel component. This can continue until all the wires are compared as listed in the wiring test plan.

If the two scanned 2D matrix codes do not match, capture device 102 can provide a different audible or visual indicator to prompt the quality technician to retest the last point. If the test still fails, the failed data point can be placed into an exception database and the test moves on to the next test point.

Block 2220 includes storing or recording, using capture device 102, server device 128, or data storage device 108, inconstancy or exception and potential repair list if comparison made at block 2218 indicates the 2D matrix codes for the two panel components do not match or otherwise indicates the connection of the two panel components are improperly connected.

Block 2222 includes storing or recording using capture device 102, server device 128, or data storage device 108, a result of a performing a test of the QA/QC wiring test plan. Block 2222 can be performed after the comparison made at block 2218 indicates the 2D matrix codes for the two panel components match or otherwise indicates the connection of the two panel components are properly connected. Block 2222 can also be performed after performance of block 2220.

Block 2224 includes determining if all panel components (for example, wires and equipment) covered by QA/QC wiring test have been tested or all respective tests within QA/QC wiring test have been tested. Processor 104 can execute CRPI to make that determination. If the determination of block 2224 is no, the set 2200 can continue at block 2226 to cause capture device 102 to provide a prompt for the next panel component or test of the QA/QC wiring test is to be performed.

If the determination of block 2224 is yes, the set 2200 can continue at blocks 2228 and 2230. Block 2228 includes recording, using server device 128 or data storage device 108, a record of all the tests and the test results. In an alternative arrangement, records and test results for some, but not all tests, can be provided to server device 128 or data storage device 108 at any one time, such that the complete final record is sent via multiple transmission to the server device 128 or data storage device 108, preferably until a 100% correct passing report is generated. That record or test results can be accessed by a capture device. Block 2230 includes creating and storing, using server device 128 or data storage device 108, an exception report to note the connections to be corrected and retested. Once corrected, the QA/QC wiring test can be conducted in its entirety or just the correction components according to the QA SOP for that panel.

X. Example Field Operation

A panel can be described as having a product life cycle with multiple stages. The multiple stages can, for example, include a design stage, a construction stage, an operating stage, and an end-of-life stage. The example embodiments can be applicable for use during one or more of the multiple stages. This section describes functions having at least some relevance to at least the operating stage.

During the operating stage, a panel may be positioned at location at which the panel is placed into operation for its intended purpose, such as power distribution panel being positioned at an oil refinery and a control panel being positioned at an automobile manufacturing plant. Operating the panel at that location may be referred to as operating the panel "in the field." An operating location can, but is not required to be, different than the location at which the panel is constructed. Some panels are mobile such that the panels are operational while the panel is in motion. Mobile panels can include a battery or some other power supply to provide operating power to the panel. Panels can be operational during the construction stage.

A person, such as a plant technician, may need or desire to obtain information, such as wiring details, regarding a panel or a component of the panel at the operating location. Such information may be needed to operate, service, maintain or repair the panel or some panel component therefrom.

Figure 15:
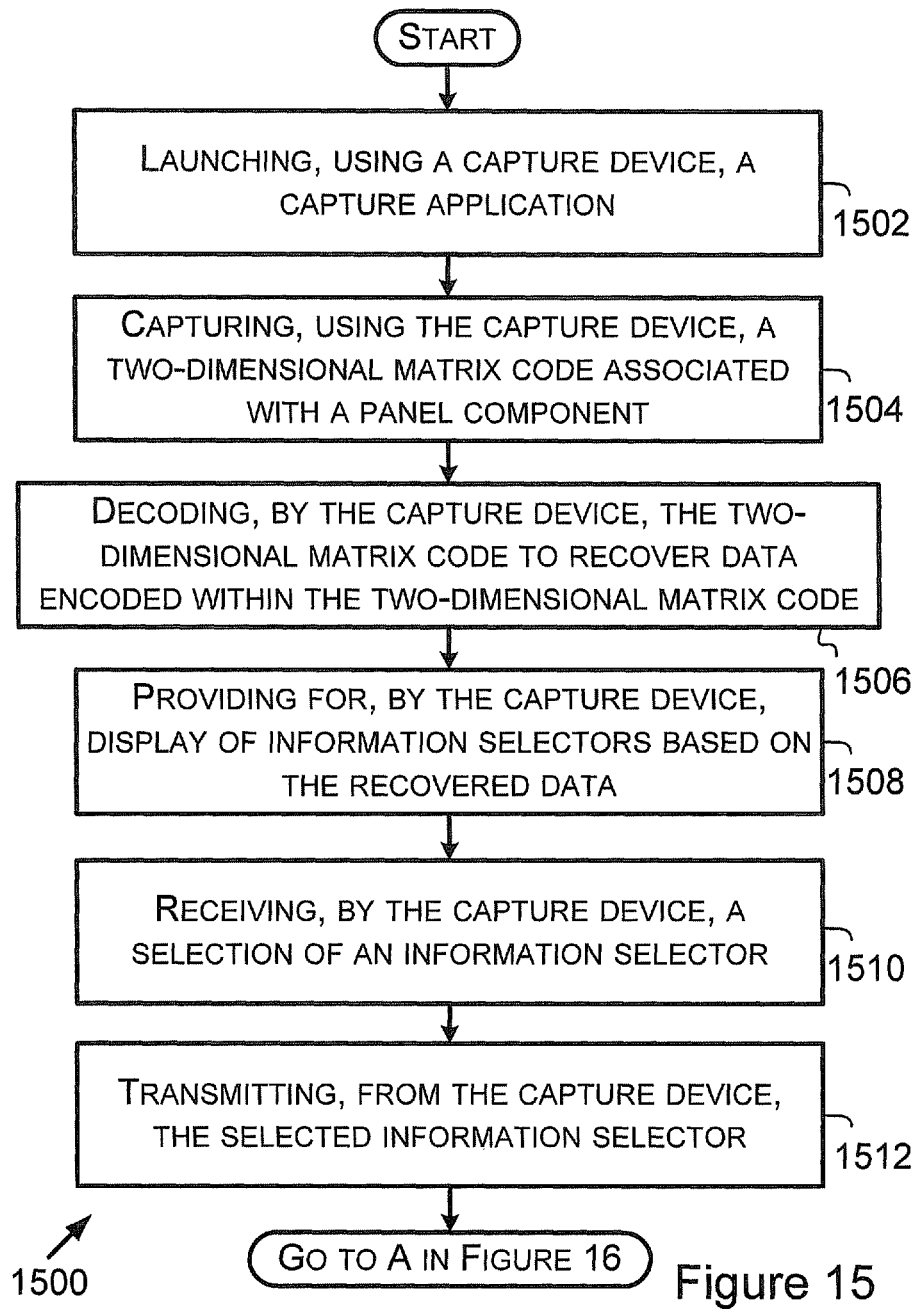
FIGS. 15 and 16 depict a flowchart showing a set of functions that can be carried out in accordance with one or more example embodiments.
Figure 16:
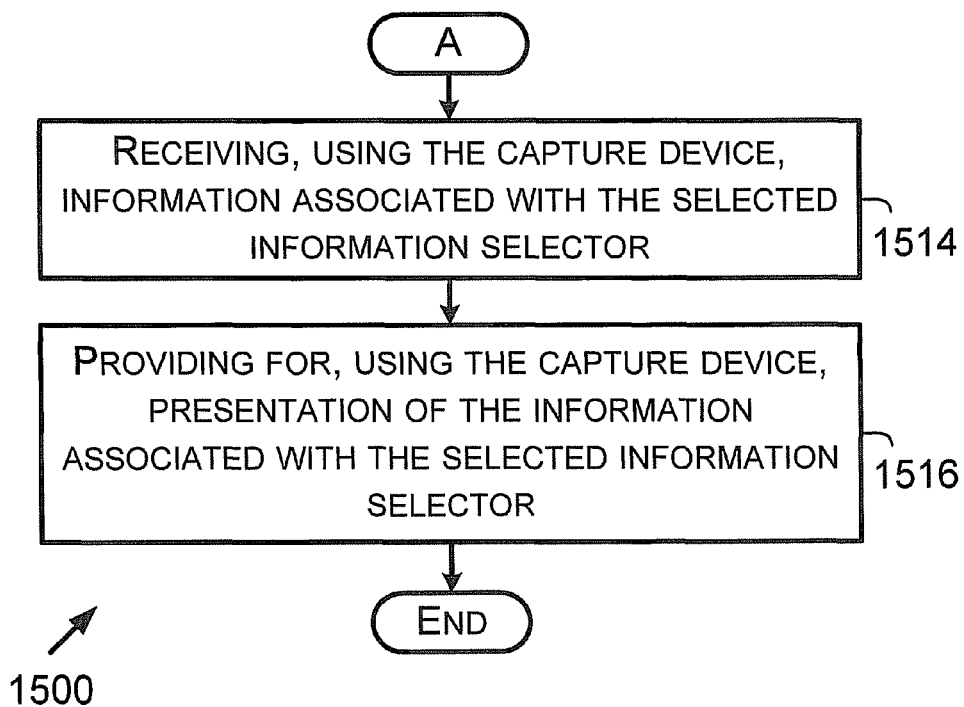

FIGS. 15 and 16 depict a flowchart showing a set of functions 1500 (or more simply, "the set 1500") that can be carried out in accordance with one or more example embodiments described herein. The functions of the set 1500 are shown within blocks labeled with even numbers between 1502 and 1516, inclusive. Each function of the set 1500 can be performed by an element or a combination of elements of system 100. A person having ordinary skill in the art will understand that the capture device referred to in set 1500 can be any capture device described herein. For purposes of describing the set 1500, however, that capture device is referred to capture device 102.

Figure 11:
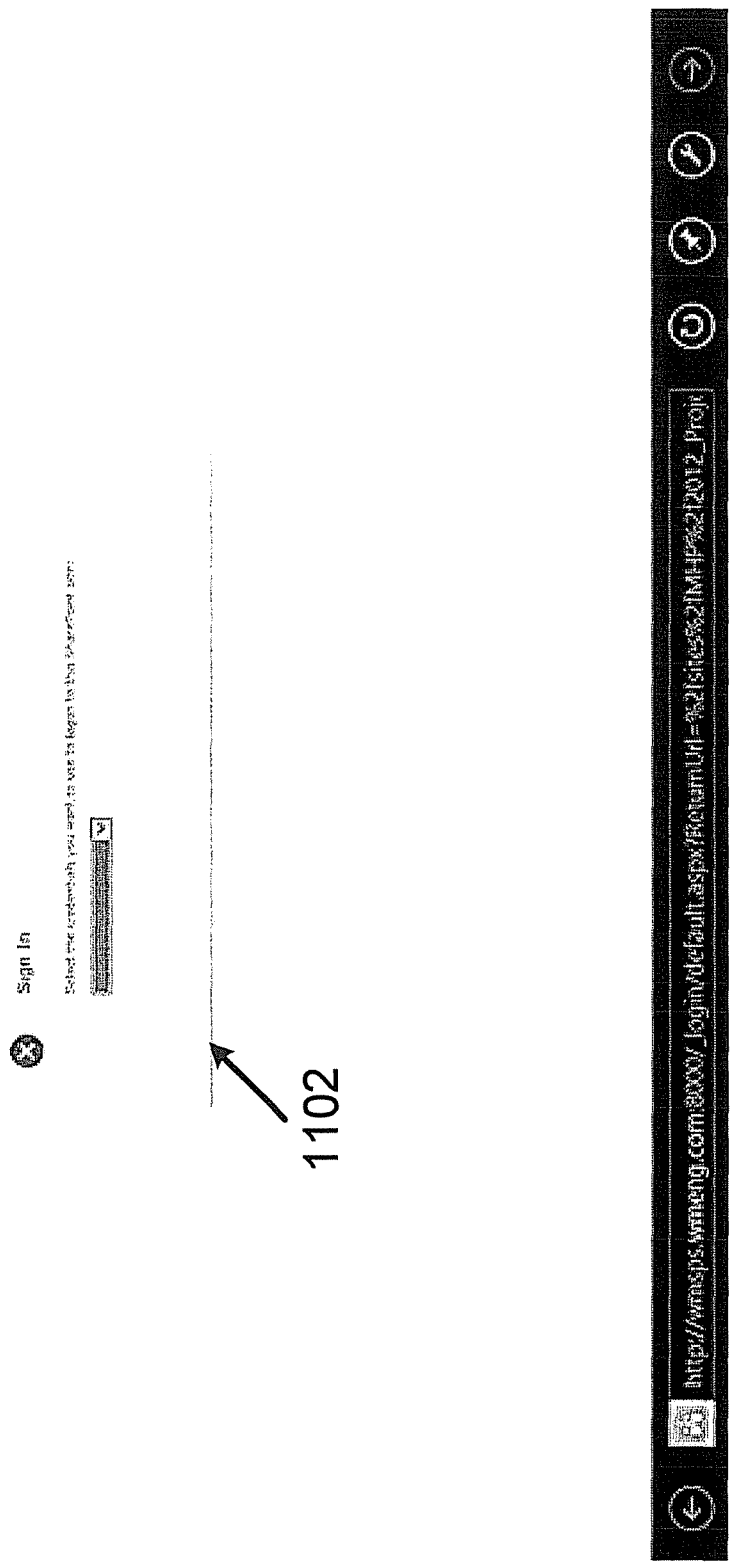
FIG. 11 shows an example screen shot displayable by a display device of a capture device.

Block 1502 includes launching, using a capture device, a capture application. The capture application can comprise program instructions of CRPI 125. Launching the capture application can include using user interface device 110 to select the capture application and processor 104 executing the program instructions arranged as the capture application. FIG. 11 shows an example screen shot 1100 a display device of user interface device 110 can display to prompt entry of credentials to login into server device 128 to access information from data storage device 108. The credentials can be stored within data storage device 108 (see, FIG. 17, block 1712) prior to granting access to data stored within data storage device 108. Starting a panel data inquiry process (see 2306 in FIG. 23) can include launching the capture application. The capture application can comprise an application, such as an Android application executable using the Android platform and downloadable a source of applications referred to as Google play from Google Inc. In alternative embodiments, the capture application can be compatible for use with devices manufactured by Apple Inc. of Cupertino, Calif., such as an iPad mini, an IPad or an IPhone 5, or tablet devices configured to execute software produced by Microsoft Corporation of Redmond, Wash.

Figure 6:
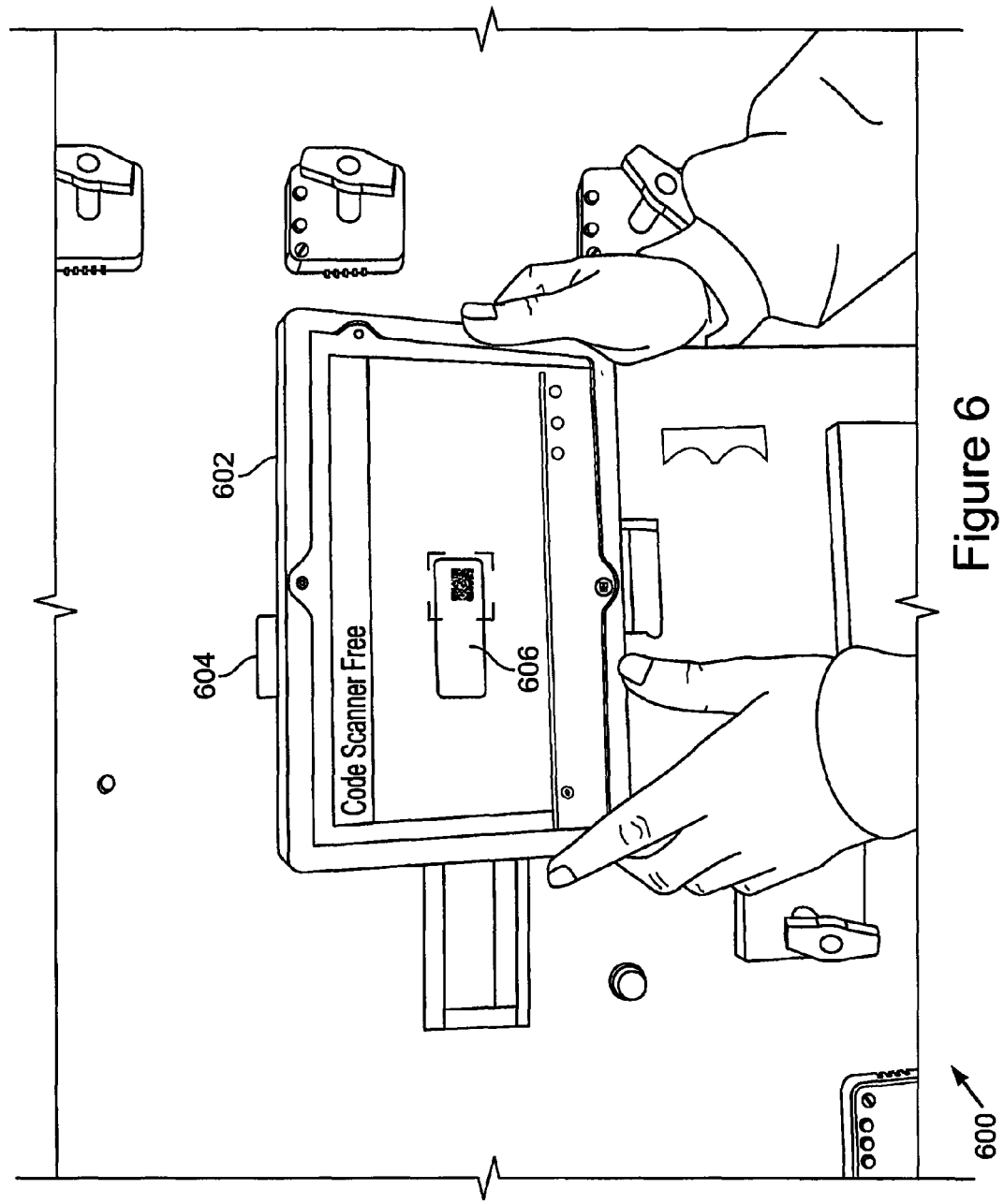
FIG. 6 is an image of capturing a two-dimensional matrix code.
Figure 7:
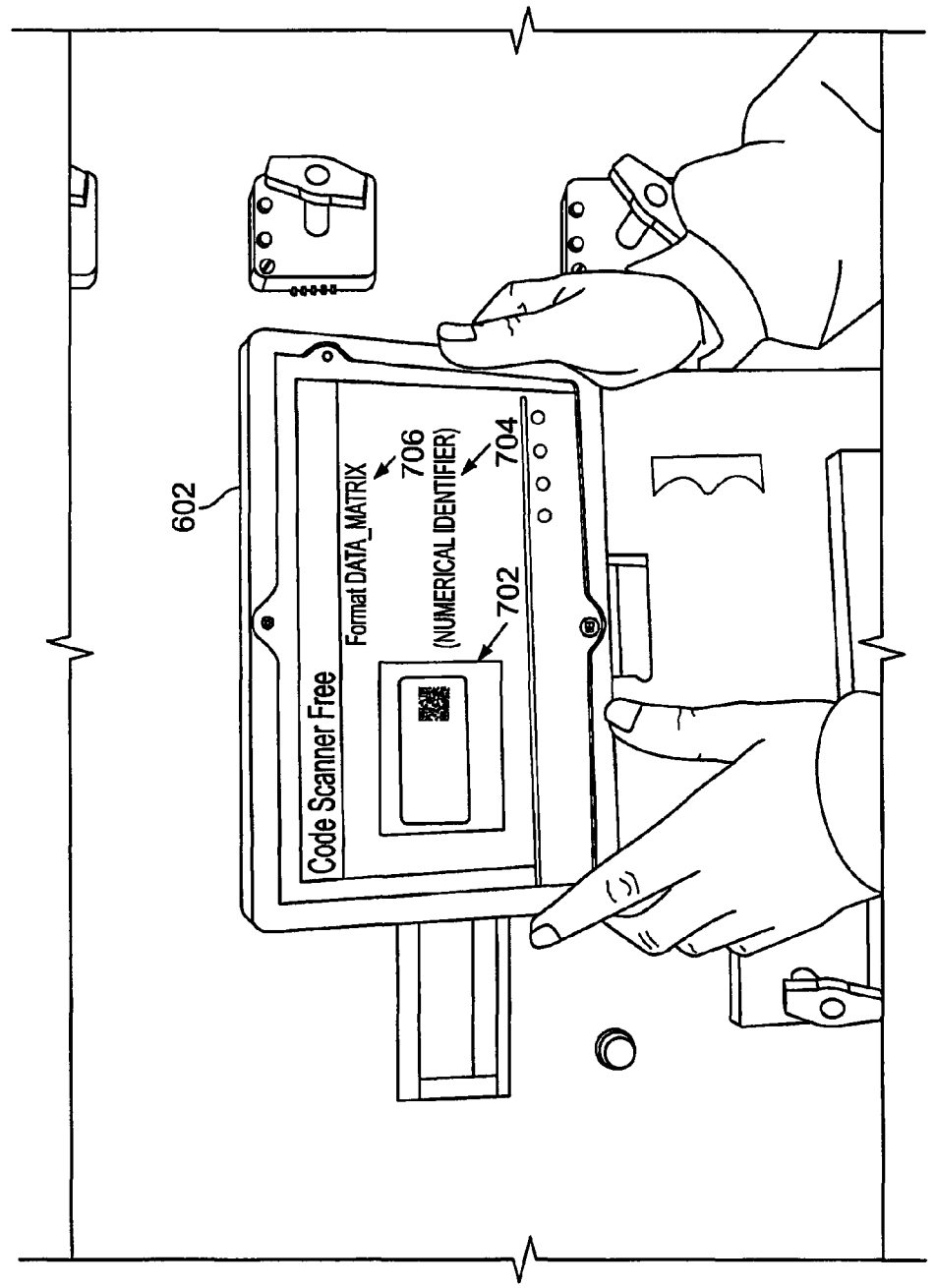
FIG. 7 is an image of an example two-dimensional matrix code displayed by a capture device.

Next, block 1504 includes capturing, using the capture device, a 2D matrix code associated with a panel component. FIG. 6 shows an image 600 illustrating an example of capturing a 2D matrix code. As shown in FIG. 6, a capture device 602, arranged as or within a tablet computing device, is used to capture a 2D matrix code 604 for a transformer (an example panel component), and a display device 606 of capture device 602 displaying an image of 2D matrix code 604. FIG. 7 shows an image 700 illustrating an example of an image 702 of 2D matrix code 604, a numerical identifier 704 identified from 2D matrix code 604, and text 706 indicating the type of 2D matrix code captured using capture device 602.

Figure 8:
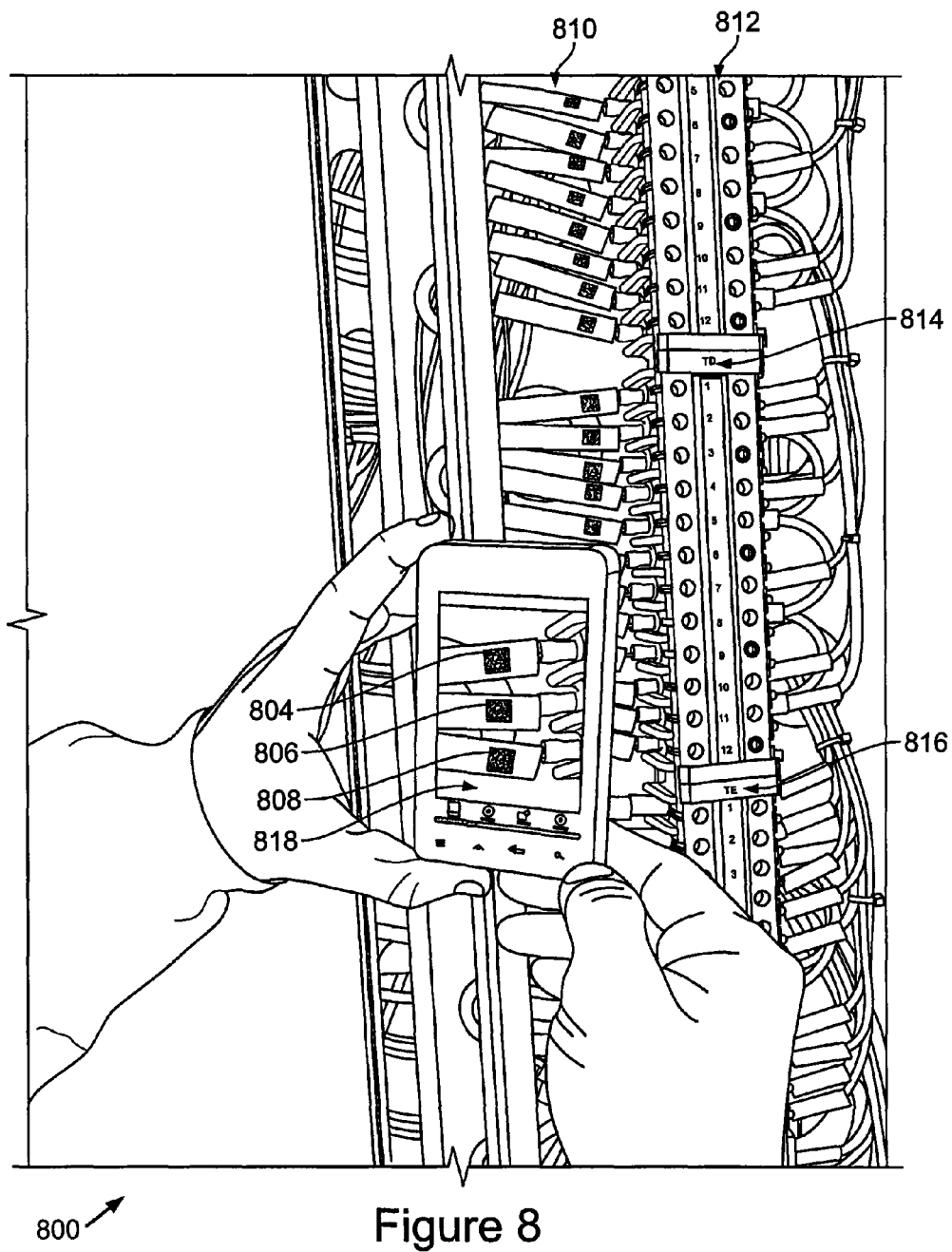
FIG. 8 is an image of capturing a two-dimensional matrix code.

Similarly, FIG. 8 shows an image 800 illustrating an example of capturing a 2D matrix code from wire labels 810 associated with conductors connected to a terminal block 814, and terminal blocks 812 and 814. As shown in FIG. 8, a capture device 802, arranged as or within a smart-phone device, is used to capture a 2D matrix code from the wire tags 810, a display device 818 of capture device 802 displaying an image of 2D matrix codes 804, 806, and 808. Capture device 802 can be configured to select one of 2D matrix codes 804, 806, and 808 for decoding.

Next, block 1506 includes decoding, by the capture device, the 2D matrix code to recovered data encoded within the 2D matrix code. Decoding the 2D matrix code can comprise processor 104 executing program instructions of CRPI 125 to decode the 2D matrix code. In one respect, decoding the 2D matrix code can occur automatically in response to capturing of the 2D matrix code. In another respect, decoding the 2D matrix code can occur in response to user interface device 110 being used to enter a selection to decode the 2D matrix code. Other examples of events that trigger decoding the 2D matrix code are also possible. FIG. 10 shows an example screen shot 1000 displayable by a display device of capture device 802 after recovering the encoded data. The encoded data can include a uniform resource locator (URL) 1002 from which panel component information, associated with the 2D matrix code, can be retrieved. Screen shot 1000 includes an image of the captured 2D matrix code.

Next, block 1508 includes providing for, by the capture device, display of information selectors based on the recovered data. Providing for display of the information selectors can comprise processor 104 executing program instructions of CRPI 125 to cause a display device of user interface device 110 to display the information selectors, or to cause communication device 112 to transmit the information selectors to local device 130 for display of the information selectors at a display device of local device 130. In FIG. 23, providing for display of the information selectors can include the functions of blocks 2312 and 2314.

Figure 9:
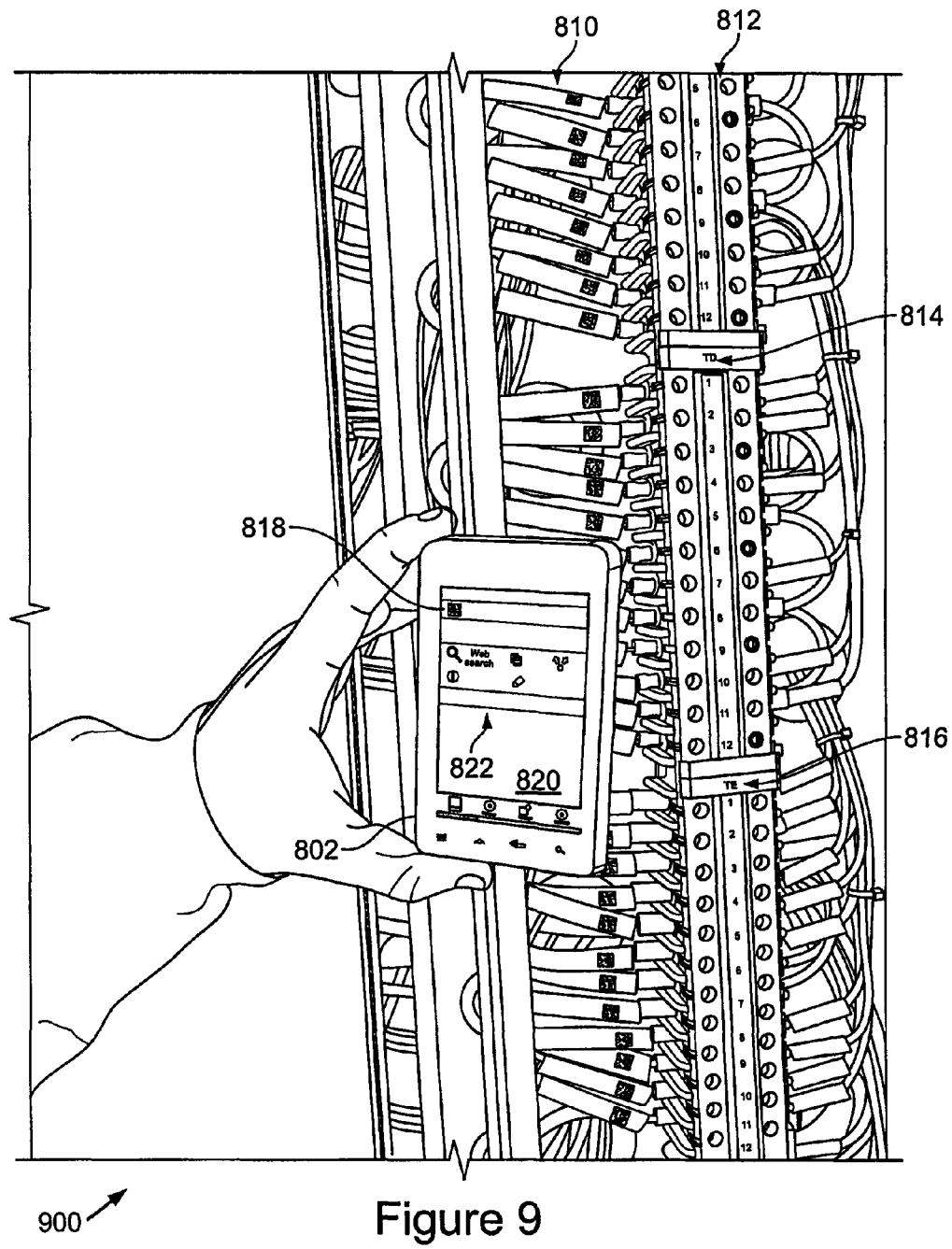
FIG. 9 is an image illustrating an example display device of an example capture device displaying information selectors associated with a captured 2D matrix code.

FIG. 9 shows an image 900 illustrating an example display device 820 of capture device 802 displaying information selectors 822 associated with a captured 2D matrix code 818. Information selectors 822 can comprise one or more selectors that are selectable to trigger sending a request for information associated with the selected information selector. As an example, one of the information selectors 822 can comprise a web-search icon selectable to search for information using server 128 or data storage device 108. See, FIG. 23, block 2316 for retrieval and display of information selectors from a remotely-located data storage device 108, and block 2318 for retrieval and display of information selectors from a locally-located data storage device 108. See, FIG. 23, block 2320 that Auto selects either with block 2316 the Remote DSD (108) or with block 2318 the Local DSD (108) for selected information retrieval. FIG. 2322 is the manual selection of the display device either Print with block 2326 or User Interface display with block 2324, Next, block 1510 includes receiving, by the capture device, a selected information selector. Receiving the selected information selector (i.e., one or more information selectors) can comprise user interface device 110 receiving a selection of the information selector. User interface device 110 can receive the selection using its touch screen display, for example. Receiving the information selector can occur in different ways such as receiving the information selector selection using a speech recognizer of capture device 802 or using a selector device, such as a mouse, at local device 130.

Next, block 1512 includes transmitting, from the capture device, the selected information selector. Transmitting the selected information selector can comprise transmitting the information selector to network 116 using the wired communication link 118 or the wireless communication link 120 for transmission, in turn, to data storage device 108 or server device 128.

Next, block 1514 includes receiving, using the capture device, information associated with the selected information selector. Receiving the information associated with the selected information selector can comprise communication device 112 receiving information that is transmitted over network 116. In that regard, receiving the information associated with the selected information selector can include receiving the information using wired communication link 118 or wireless communication link 120. Upon, during, or after receiving the information associated with the selected information selector, communication device 112 can transmit the received information to one or more elements of capture device 112, such as processor 104, data storage device 106, or user interface device 110.

Figure 12:
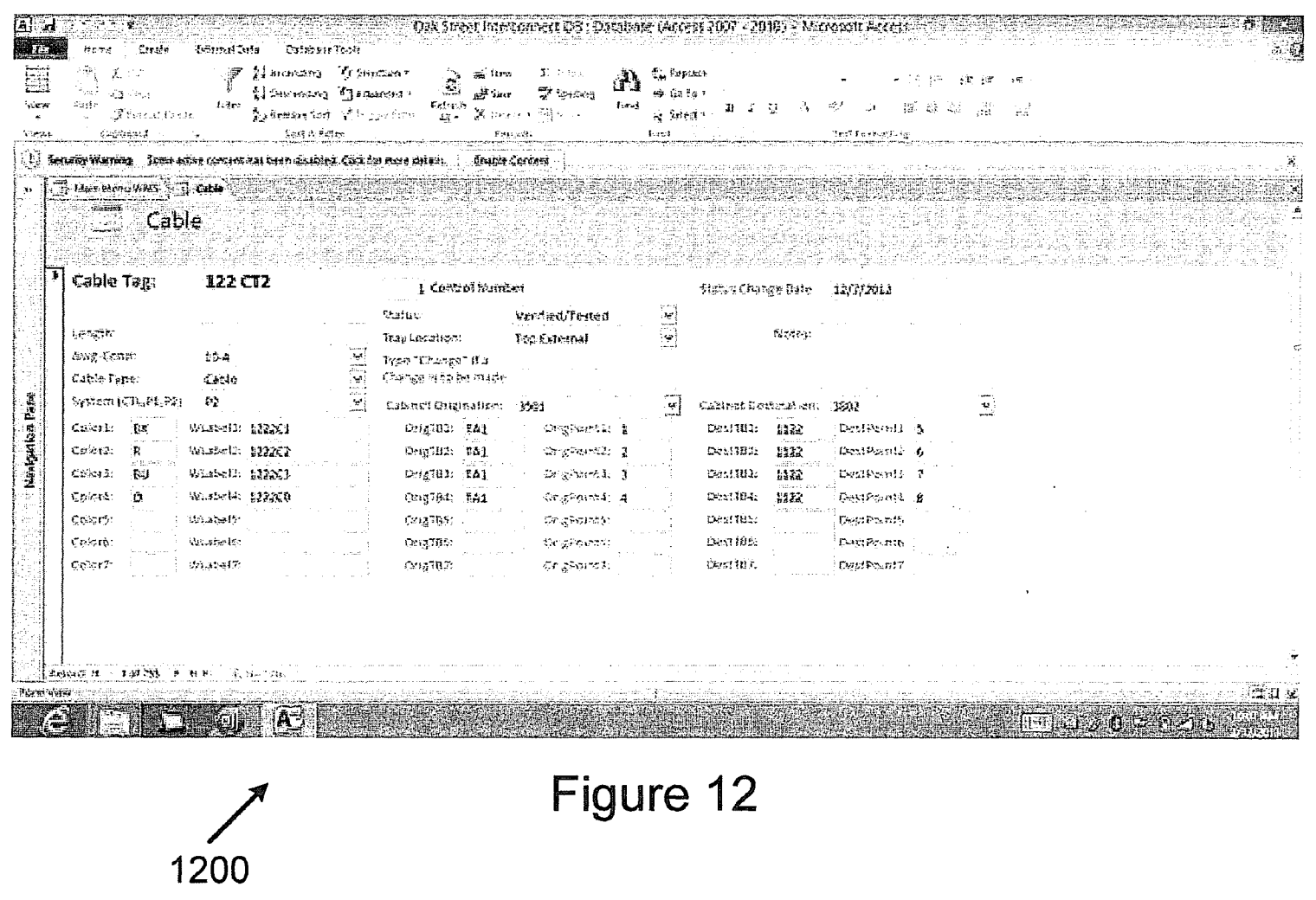
Figure 13:
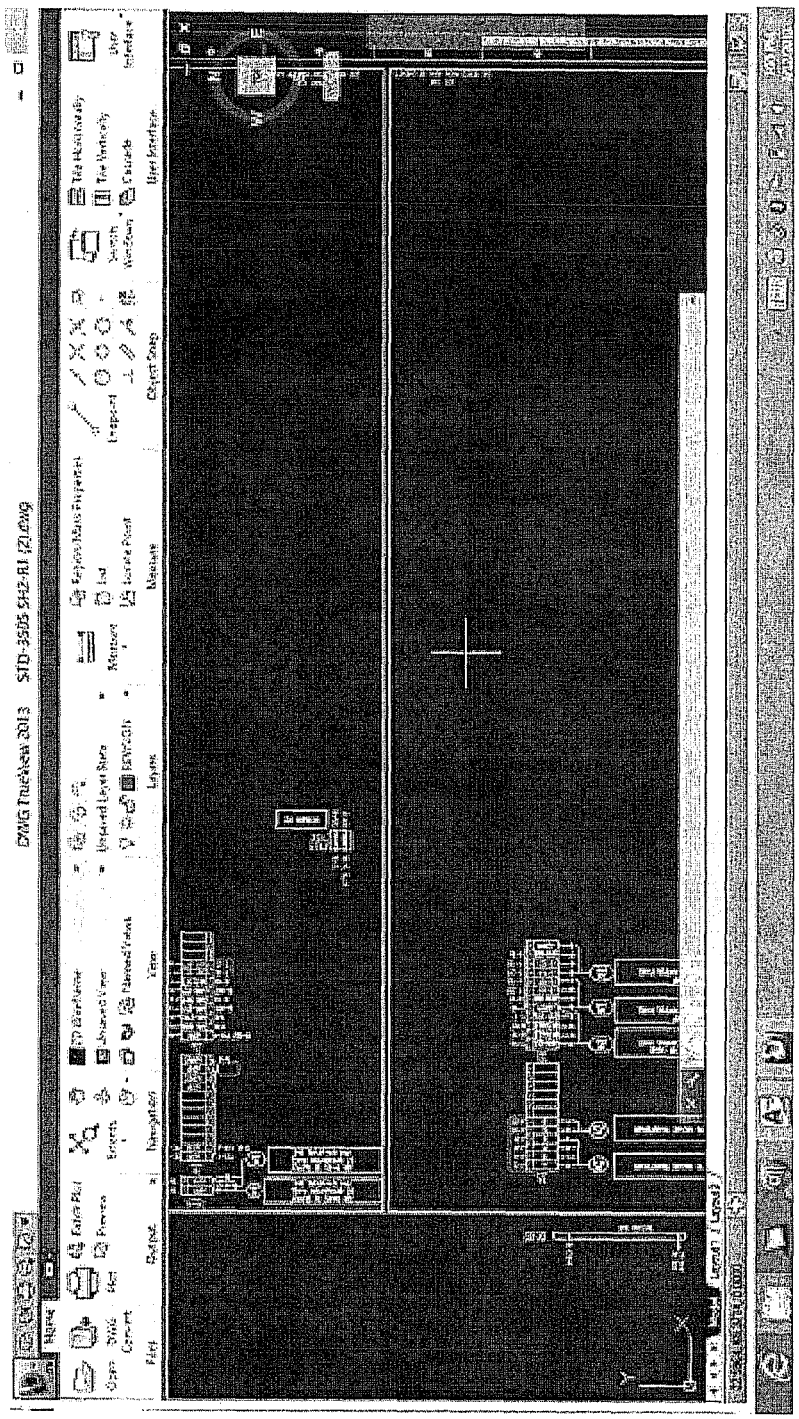
FIG. 13 shows an example display screen including an example electrical schematic drawing retrieved from a data storage device.

Next, block 1516 includes providing for, using the capture device, presentation of the information associated with the selected information selector. As an example, providing for presentation of the information can include processor 104 executing program instructions of CRPI 125 to cause a display device of user interface device 110 to display the information. FIG. 12 shows an example display screen 1200 including example data from a data record retrieved from data storage device 108. As shown in FIG. 12, the displayed data can include wire colors, wire numbers, wire sizes, wire (cable) types, cabinet (panel) origination, and cabinet (panel) destination. FIG. 13 shows an example display screen 1300 including an example electrical schematic drawing retrieved from data storage device 108.

Additionally or alternatively, providing for presentation of the information can include processor 104 executing program instructions of CRPI 125 to cause communication device 112 to transmit the information to local device 130 via wireless communication link 132 or wired communication link 134. FIG. 23 shows an example in which the local device 130 can comprise a printer 2302 to print the information, such as a wiring drawing, or a laptop or table computing device 2304 to display the information, such as the wiring drawing. Additionally or alternatively, server device 128 can be arranged to send the information, such as the wiring drawing, directly to local device 130.

For the end-of-life stage referred to above, data storage device 108 can include panel control information regarding proper disposal procedures or requirements or recycling information, procedures or requirements. A capture device can retrieve the end-of-life stage information by capturing the 2D matrix code associated with the panel component and selecting an information selector associated with end-of-life stage information.

XI. Additional Example Embodiments

This section of the detailed description includes multiple enumerated examples.

1. A method comprising (i) capturing, by a capture device, a 2D matrix code positioned on a tag or wire label attached to a signal conductor or panel component, (ii) decoding, by the capture device, the 2D matrix code to recover data encoded within the 2D matrix code, (iii) transmitting, from the capture device, at least a portion of the recovered data, and (iv) receiving, by the capture device, data that is associated with the signal conductor or communication instrument to which the tag is attached.

2. The method of example 1, wherein the 2D matrix code is etched into the first tag.

3. The method of example 1, wherein the tag comprises a wire label.

4. The method of example 1, wherein the 2D matrix code is printed on an adhesive material affixed to the signal conductor or panel component.

5. The method of example 1, wherein the capture device comprises a smart-phone or a tablet computing device.

6. The method of example 1, wherein the 2D matrix code comprises a quick response (QR) code.

7. The method of example 1, wherein the at least a portion of the recovered data comprises a uniform resource locator for information stored at a data storage device.

8. A method comprising: (i) receiving, by a server device from a capture device that captured a first 2D matrix code associated with a first panel component, at least a portion of data encoded within the first 2D matrix code, (ii) retrieving, by the server device, data that is associated with the first panel component, and (iii) transmitting, from the server device to the capture device, the data associated with the first panel component.

9. The method of example 8, wherein the data associated with the first panel component comprises an operation manual, an electrical wiring schematic, a product specification, a test plan, a video file, or an audio file.

10. The method of example 8, wherein the data associated with the first panel component comprise data that replaced obsolete data associated with the first panel component.

11. A method comprising: (i) capturing, using a capture device, a first 2D matrix code associated with a first panel component; (ii) capturing, using the capture device, a second 2D matrix code associated with a second panel component, (iii) providing for, using the capture device, comparison of the first 2D matrix code and the second 2D matrix code, and (iv) outputting, using the capture device, a first indication if a result of the comparison is that the first 2D matrix code matches the second 2D matrix code or a second indication if the result of the comparison is that the first 2D matrix code does not match the second 2D matrix code.

12. The method of example 11, wherein providing for the comparison of the first 2D matrix code and the second 2D matrix code comprises comparing at least a portion of data encoded within the first 2D matrix code to at least a portion of data encoded within the second 2D matrix code.

13. The method of example 11 or 12,
wherein the first panel component comprises a conductor configured for connecting directly to a terminal block within a panel, and
wherein the second panel component comprises a panel component other than a conductor configured for connecting directly to a terminal block within a panel.

14. The method of example 11, further comprising:
transmitting, using the capture device, data indicating the result of the comparison to network for transmission to a server device or a data storage device.

15. The method of example 11, wherein each of the first 2D matrix code and the second 2D matrix code is a static 2D matrix code.

16. The method of example 11, further comprising:
executing, using the capture device, a test plan for a panel to which the first panel component and the second panel component are to be attached, wherein executing the test plan causes the capture device to provide a prompt for testing connection of the first panel component of the second panel component.

17. The method of example 16, further comprising:
capturing, using the capture device, a 2D matrix code associated with a major equipment matrix tag to confirm that the test plan is correct for the panel being tested.

18. The method of example 11, wherein at least one of the first 2D matrix code and the second 2D matrix code is printed on a wire label or a wire tag.

19. The method of example 11, wherein at least one of the first 2D matrix code and the second 2D matrix code is printed on a terminal block wing configured for attaching to a terminal block within a panel.

20. The method of example 11, wherein at least one of the first 2D matrix code and the second 2D matrix code is printed on a panel component.

21. The method of example 11,
wherein capturing the first 2D matrix code associated with the first panel component comprises capturing the first 2D matrix code printed on a panel component label or tag, and
wherein capturing the second 2D matrix code associated with the second panel component comprises capturing the first 2D matrix code printed on a paper drawing.

22. The method of example 11,
wherein capturing the first 2D matrix code associated with the first panel component comprises capturing the first 2D matrix code etched onto a panel component label or tag, and
wherein capturing the second 2D matrix code associated with the second panel component comprises capturing the first 2D matrix code printed on a paper drawing.

23. A method comprising: (i) capturing, using a capture device, a first 2D matrix code associated with a panel component of a panel; (ii) capturing, using the capture device, a second 2D matrix code associated with a field device external to the panel, (iii) providing for, using the capture device, comparison of the first 2D matrix code and the second 2D matrix code, and (iv) outputting, using the capture device, a first indication if a result of the comparison is that the first 2D matrix code matches the second 2D matrix code or a second indication if the result of the comparison is that the first 2D matrix code does not match the second 2D matrix code.

24. A non-transitory computer-readable data storage device comprising program instructions executable by a processor to carry out the methods of any one of examples 1 through 23.

25. A device comprising the non-transitory computer-readable data storage device of example 24.

26. The device of claim 25, wherein the device comprises a smart-phone or a tablet computing device.

XII. Additional Example Uses

A person having ordinary skill in the art will understand that one or more of the example embodiments can be implemented for components other than panel components of a panel. For example, the use of 2D matrix codes can be applied to conductors, termination points, such as power and cabling outlets, and equipment used in hospitals, schools, manufacturing plants, and other structures so as to request and receive data associated with those components.

XIII. Conclusion

Example embodiments have been described above. Those skilled in the art will understand that changes and modifications can be made to the described embodiments without departing from the true scope and spirit of the present invention, which is defined by the claims.

We claim:
1. A method comprising:
capturing, by a capture device, a first two-dimensional matrix code located on a first panel component installed within an electrical panel, and a second two-dimensional matrix code located on a second panel component installed within the electrical panel, wherein the first panel component is connected to the second panel component;
decoding, by the capture device, the first two-dimensional matrix code to recover data encoded within the first two-dimensional matrix code, and the second two-di- mensional matrix code to recover data encoded within the second two-dimensional matrix code;

transmitting, by the capture device to a server device, at least a portion of the recovered data encoded within the first two-dimensional matrix code and at least a portion of the recovered data encoded within the second two-dimensional matrix code;

receiving, by the capture device from the server device, an indication that connection of the first panel component to the second panel component installed within the electrical panel is a correct connection or is an incorrect connection; and displaying, by the capture device, the indication that connection of the first panel component installed within the electrical panel to the second panel component installed within the electrical panel is a correct connection or is an incorrect connection.

2. The method of claim 1, wherein the capture device comprises a tablet device, a smart-phone, or a personal digital assistant.

3. The method of claim 1, wherein the first panel component is selected from the group consisting of a signal conductor, an insulated wire, a coaxial or fiber optic cable, a communication instrument, a relay, a field device, and a variable frequency drive.

4. The method of claim 3, wherein the first two-dimensional matrix code is positioned on a first tag that is attached to the first panel component.

5. The method of claim 4, wherein the first tag is attached to the first panel component at a position substantially close to a point of signal termination.

6. The method of claim 4, wherein the first two-dimensional matrix code is printed onto the first tag.

7. The method of claim 4, wherein the first two-dimensional matrix code is attached to the first tag using an adhesive.

8. A method comprising:

receiving, by a server device from a capture device, at least a portion of data encoded within a first two-dimensional matrix code located on a first panel component installed within an electrical panel, and at least a portion of data encoded within a second two-dimensional matrix code located on a second panel component that is installed within the electrical panel and that is connected to the first panel component;

comparing, by the server device, the at least a portion of the data encoded within the first two-dimensional matrix code located on the first panel component and the at least a portion of the data encoded within the second two-dimensional matrix code located on the second panel component to determine whether connection of the first panel component installed within the electrical panel to the second panel component installed within the electrical panel is a correct connection or is an incorrect connection; and providing, by the server device to the capture device, an indication that connection of the first panel component installed within the electrical panel to the second panel component installed within the electrical panel is a correct connection or is an incorrect connection.

9. The method of claim 8, further comprising:

retrieving, by the server device, data that is associated with the first panel component, wherein the data associated with the first panel component comprises an operation manual, an electrical wiring schematic, a product specification, a test plan, a video file, or an audio file.

10. The method of claim 8, further comprising:

retrieving, by the server device, data that is associated with the first panel component, wherein the data associated with the first panel component comprise data that replaced obsolete data associated with the first panel component.

11. The method of claim 4, wherein the two-dimensional matrix code is etched into the first tag.

12. The method of claim 4, wherein the tag comprises a wire label.

13. The method of claim 8, wherein comparing the at least a portion of the data encoded within the first two-dimensional matrix code located on the first panel component and the at least a portion of the data encoded within the second two-dimensional matrix code located on the second panel component includes comparing the at least a portion of the data encoded within the first two-dimensional matrix code located on the first panel component and the at least a portion of the data encoded within the second two-dimensional matrix code located on the second panel component to an electronic file defining connection of the first panel component and the second panel component.

14. The method of claim 8, wherein comparing the at least a portion of the data encoded within the first two-dimensional matrix code located on the first panel component and the at least a portion of the data encoded within the second two-dimensional matrix code located on the second panel component includes comparing the at least a portion of the data encoded within the first two-dimensional matrix code located on the first panel component to the at least a portion of the data encoded within the second two-dimensional matrix code located on the second panel component.

15. The method of claim 8, wherein the first panel component is a terminal block including multiple terminal connectors, and wherein the second panel component is a copper wire conductor or a fiber optic cable.

16. The method of claim 1, further comprising:

presenting audibly, by the capture device, the indication that connection of the first panel component installed within the electrical panel to the second panel component installed within the electrical panel is a correct connection or is an incorrect connection.

17. The method of claim 1, further comprising:

receiving, by the capture device from the server device, data associated with the first panel component; and displaying, by the capture device, the data associated with the first panel component, wherein the data associated with first panel component comprise an operation manual, an electrical wiring schematic, a product specification, a test plan, a video file, or an audio file.

18. The method of claim 1, wherein the first panel component comprises an electrical or optical conductor and a wire label or tube surrounding at least a portion of the electrical or optical conductor, and wherein the first two-dimensional matrix code is printed on the wire label or tube.

19. The method of claim 1, further comprising:

capturing, by the capture device, a two-dimensional matrix code located on the electrical panel;

decoding, by the capture device, the two-dimensional matrix code located on the electrical panel to recover data encoded within the two-dimensional matrix code located on the electrical panel;

transmitting, by the capture device to the server device, at least a portion of the recovered data encoded within the two-dimensional matrix code located on the electrical panel, wherein at least a portion of the recovered data encoded within the two-dimensional matrix code located on the electrical panel identifies the electrical panel; and receiving, by the capture device from the server device, data indicating the first panel component is used within the electrical panel.

20. A machine comprising:
a computer-readable processor;
a display;
a communication device;
a capture component, and
a computer-readable data storage medium storing computer-readable program instructions, that when executed by the processor, cause a set of functions to be performed, the set of functions comprising:
capturing, by the capture component, a first two-dimensional matrix code located on a first panel component installed within an electrical panel, and a second two-dimensional matrix code located on a second panel component that is installed within the electrical panel and is connected to the first panel component;

decoding, by the processor, the first two-dimensional matrix code to recover data encoded within the first two-dimensional matrix code, and the second two-dimensional matrix code to recover data encoded within the second two-dimensional matrix code;

transmitting, by the communication device to a server device, at least a portion of the recovered data encoded within the first two-dimensional matrix code and at least a portion of the recovered data encoded within the second two-dimensional matrix code;

receiving, by the communication device from the server device, an indication that connection of the first panel component to the second panel component installed within the electrical panel is a correct connection or is an incorrect connection; and displaying, by the display, the indication that connection of the first panel component installed within the electrical panel to the second panel component installed within the electrical panel is a correct connection or is an incorrect connection.

21. The machine of claim 20, wherein the machine includes a tablet device, a smart-phone or a personal digital assistant.

* * * * *